US012193055B2

(12) United States Patent
Liu et al.

(10) Patent No.: US 12,193,055 B2
(45) Date of Patent: Jan. 7, 2025

(54) METHOD AND DEVICE IN NODES USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 422 days.

(21) Appl. No.: 17/696,879

(22) Filed: Mar. 17, 2022

(65) Prior Publication Data
US 2022/0210836 A1    Jun. 30, 2022

Related U.S. Application Data

(63) Continuation of application No. PCT/CN2020/115917, filed on Sep. 17, 2020.

(30) Foreign Application Priority Data

Sep. 26, 2019 (CN) .................. 201910919218.X

(51) Int. Cl.
*H04W 74/08* (2024.01)
*H04L 27/00* (2006.01)
(Continued)

(52) U.S. Cl.
CPC ..... *H04W 74/0816* (2013.01); *H04L 27/0006* (2013.01); *H04L 27/26025* (2021.01);
(Continued)

(58) Field of Classification Search
CPC .......... H04L 27/0006; H04L 27/26025; H04L 5/001; H04W 72/0446; H04W 74/0816; H04W 4/40
See application file for complete search history.

(56) References Cited

U.S. PATENT DOCUMENTS

2015/0023267 A1*  1/2015  Lim ...................... H04L 1/1854
                                                  370/329
2015/0222402 A1*  8/2015  Ouchi ................... H04W 72/21
                                                  370/329
(Continued)

FOREIGN PATENT DOCUMENTS

CN      101964704 A      2/2011
CN      103339999 A     10/2013
(Continued)

OTHER PUBLICATIONS

ISR received in application No. PCT/CN2020/115917 dated Dec. 1, 2020.
(Continued)

*Primary Examiner* — Jungwon Chang

(57) ABSTRACT

The present disclosure provides a method and device in nodes used for wireless communication. A node receives a first signaling; transmits a first signal; receives a second signaling; and transmits a second signal; the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay; the first delay is not less than a reference delay, and the reference delay is related to a subcarrier spacing (SCS) occupied by the second signal in frequency domain. The application ensures the correct reception of the feedback.

20 Claims, 7 Drawing Sheets

(51) Int. Cl.
*H04L 27/26* (2006.01)
*H04W 72/0446* (2023.01)
*H04W 74/0816* (2024.01)
*H04L 5/00* (2006.01)
*H04W 4/40* (2018.01)

(52) U.S. Cl.
CPC ......... *H04W 72/0446* (2013.01); *H04L 5/001* (2013.01); *H04W 4/40* (2018.02)

(56) References Cited

U.S. PATENT DOCUMENTS

| | | | |
|---|---|---|---|
| 2017/0272384 A1 | 9/2017 | Lee | |
| 2018/0234973 A1 | 8/2018 | Lee | |
| 2020/0022175 A1* | 1/2020 | Xiong | H04L 5/001 |
| 2022/0046604 A1* | 2/2022 | Zhang | H04W 72/0446 |
| 2023/0403686 A1* | 12/2023 | Zhang | H04L 5/00 |
| 2024/0172193 A1* | 5/2024 | Wu | H04L 5/0005 |

FOREIGN PATENT DOCUMENTS

| | | |
|---|---|---|
| CN | 110089173 A | 8/2019 |
| WO | 2017143530 A1 | 8/2017 |
| WO | 2017190566 A1 | 11/2017 |
| WO | 2018145296 A1 | 8/2018 |

OTHER PUBLICATIONS

CN201910919218.X First Office Action dated Feb. 10, 2022.
CN201910919218.X First Search Report dated Feb. 3, 2022.
CN201910919218.X Second Office Action dated Aug. 3, 2022.

* cited by examiner

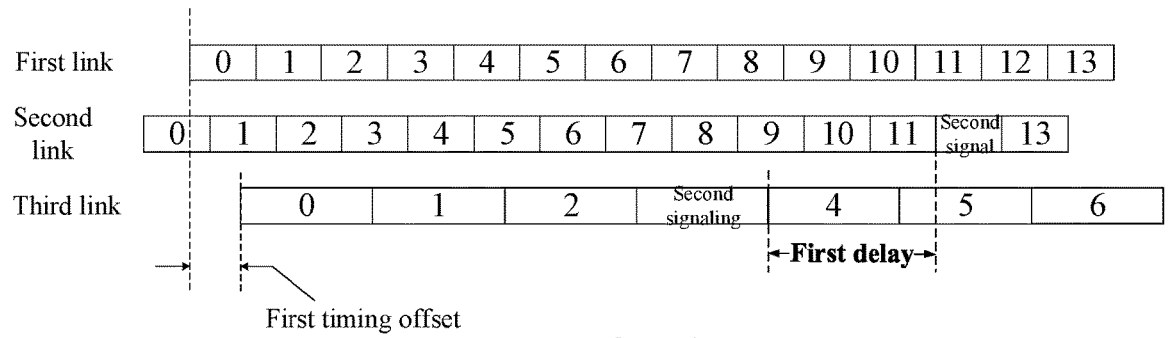
Case A
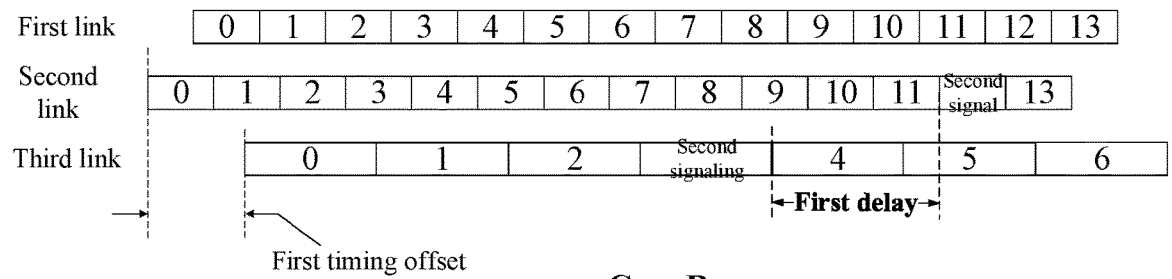
Case B
FIG. 7
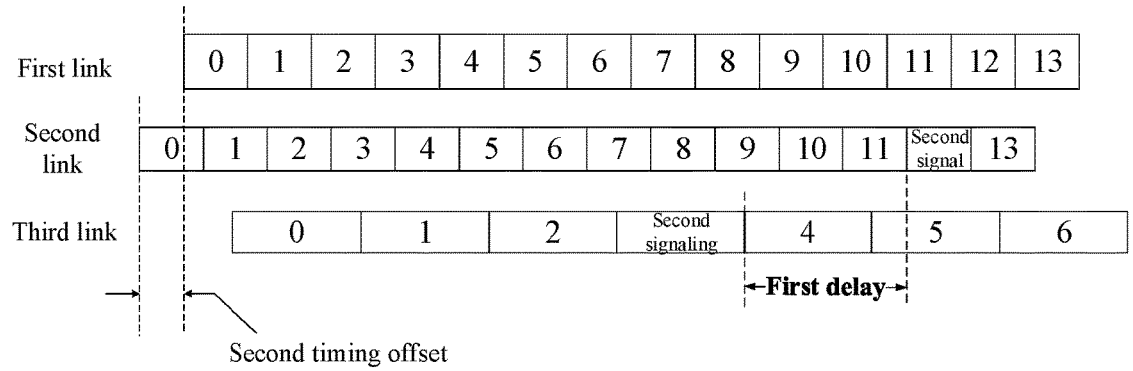
FIG. 8

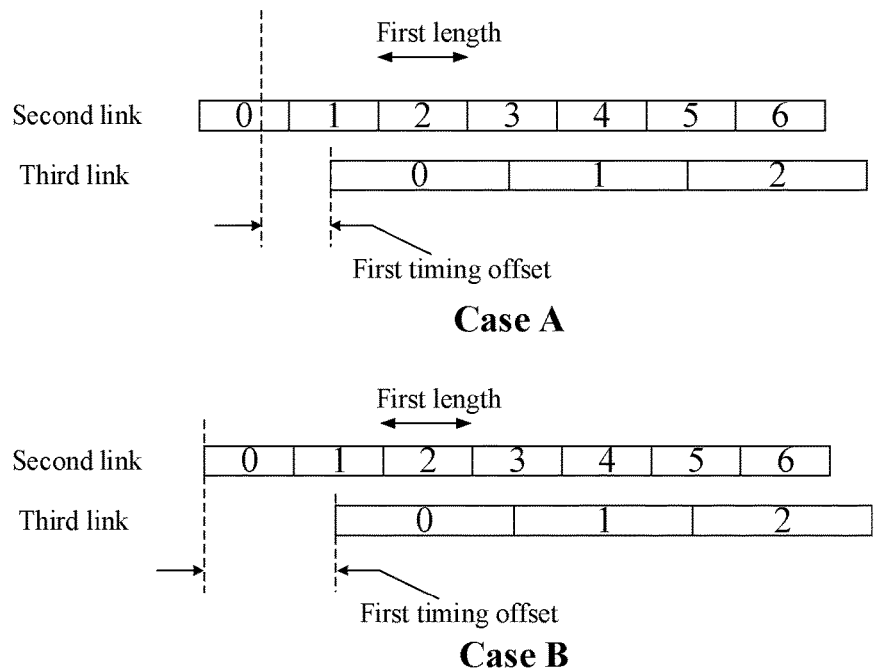

FIG. 9

| Subcarrier spacing of second signal | Subcarrier spacing of second signaling | Reference delay (number of OFDM symbols) |
|---|---|---|
| 15kHz | 15kHz | 10 (number of symbols corresponding to 15kHz SCS) |
| 15kHz | 30kHz | 10 (number of symbols corresponding to 15kHz SCS) |
| 30kHz | 15kHz | 10 (number of symbols corresponding to 15kHz SCS) |
| 15kHz | 60kHz | 10 (number of symbols corresponding to 15kHz SCS) |
| 60kHz | 15kHz | 10 (number of symbols corresponding to 15kHz SCS) |
| 30kHz | 30kHz | 12 (number of symbols corresponding to 30kHz SCS) |
| 30kHz | 60kHz | 12 (number of symbols corresponding to 30kHz SCS) |
| 60kHz | 30kHz | 12 (number of symbols corresponding to 30kHz SCS) |
| 60kHz | 60kHz | 23 (number of symbols corresponding to 60kHz SCS) |
| 60kHz | 120kHz | 23 (number of symbols corresponding to 60kHz SCS) |
| 120kHz | 60kHz | 23 (number of symbols corresponding to 60kHz SCS) |
| 120kHz | 120kHz | 36 (number of symbols corresponding to 120kHz SCS) |

FIG. 10

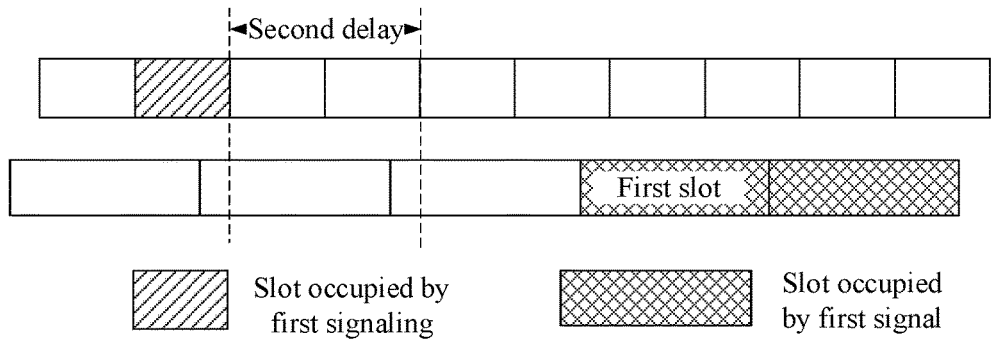
FIG. 11
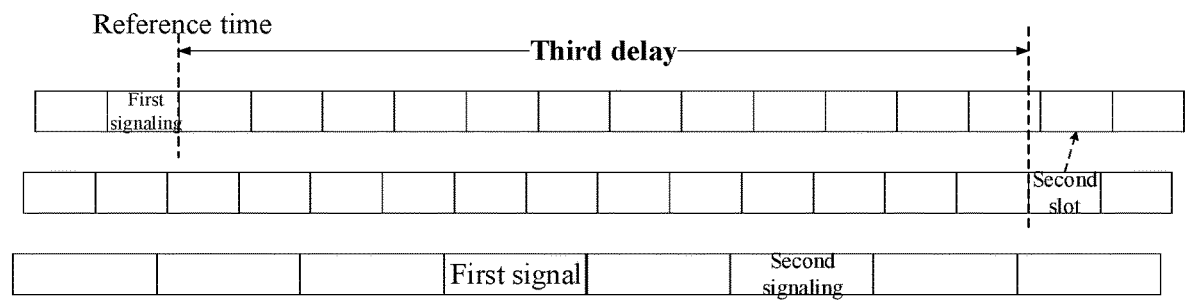
Case A
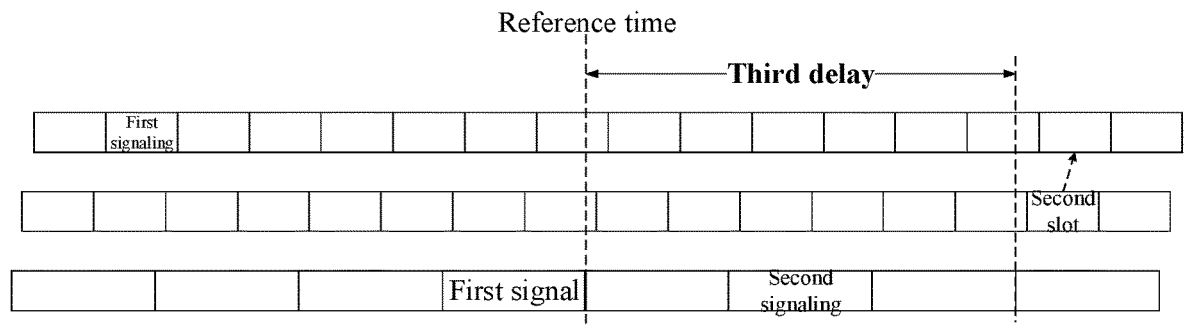
Case B
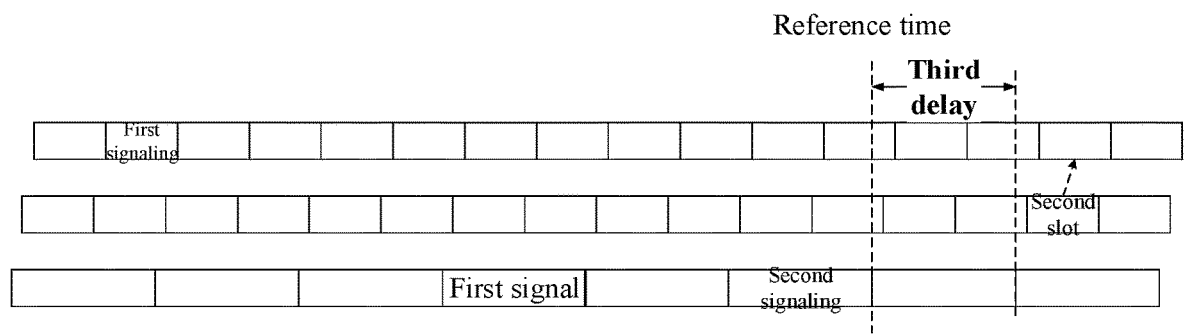
Case C
FIG. 12

METHOD AND DEVICE IN NODES USED FOR WIRELESS COMMUNICATION

CROSS REFERENCE TO RELATED APPLICATIONS

This application is the continuation of International Patent Application No. PCT/CN2020/115917, filed on Sep. 17, 2020, which claims the priority benefit of Chinese Patent Application No. 201910919218.X, filed on Sep. 26, 2019, the full disclosure of which is incorporated herein by reference.

BACKGROUND

Technical Field

The present disclosure relates to transmission methods and devices in wireless communication systems, and in particular to a transmission scheme and device of feedback information in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The technical Study Item (SI) of NR V2X was approved at 3GPP RAN #80 Plenary, and a WI was decided to be started to standardize NR V2X at 3GPP RAN #83 Plenary.

SUMMARY

Compared with the existing LTE V2X system, NR V2X has a notable feature in supporting Groupcast and Unicast as well as supporting Hybrid Automatic Repeat Request (HARQ) function. At 3GPP RANI #95 meeting, an independent feedback channel (PSFCH) is agreed to be introduced. The Physical Sidelink Feedback Channel (PSFCH) is used to carry a HARQ. In addition, 3GPP agrees that a User Equipment (UE) can report a HARQ feedback of sidelink to a base station. The design of UE reporting to the base station the HARQ feedback of the sidelink needs a solution.

In view of the problem in the design of HARQ feedback report of the sidelink, the present disclosure discloses a solution. It should be noted that though the present disclosure only took the NR V2X scenario for example in the statement above; this application is also applicable to other scenarios other than NR V2X confronting similar problems, where similar technical effects can be achieved. Additionally, the adoption of a unified solution for various scenarios, including but not limited to NR V2X and sidelink transmission, contributes to the reduction of hardcore complexity and costs. If no conflict is incurred, embodiments in a first node in the present disclosure and the characteristics of the embodiments are also applicable to a second node, and vice versa.

Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:
receiving a first signaling;
transmitting a first signal;
receiving a second signaling; and
transmitting a second signal;
herein, the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to a subcarrier spacing (SCS) of a subcarrier occupied by the second signal in frequency domain; the second signaling is used to determine information carried by the second signal, and a transmitter of the first signaling is different from a transmitter of the second signaling.

In one embodiment, for the decoding, switching, preparation time between a reception of the second signaling and a transmission of the second signal, a limitation of the reference delay is introduced to design a capability of the UE for a reception of sidelink HARQ, switching of sidelink and uplink and preparation of sidelink HARQ report, which reduces the complexity of the product implementation of NR V2X UE.

In one embodiment, by introducing the reference delay and limiting the first delay to be not less than the reference delay, the delay between receiving the sidelink HARQ and reporting the sidelink HARQ to the network does not exceed the processing capacity of the UE, so as to ensure the successful transmission of the sidelink HARQ report.

In one embodiment, by defining the reference delay and associating the reference delay with an SCS of the second signal, it is supported to adjust a minimum delay of the sidelink HARQ report according to an SCS of a channel adopted by the sidelink HARQ report, so as to avoid introducing a large number of UE capability to report signaling, thus saving the header overhead.

According to one aspect of the present disclosure, the above method is characterized in also comprising:
transmitting first information;
herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first timing offset is used to determine the first information, and the reference link is one of the first link and the second link; the first information is transmitted via an air interface.

In one embodiment, the first information carries information related to the first timing offset enables that the network side can acquire sidelink timing information, so as to avoid the timing ambiguity in the sidelink HARQ report between the UE and the base station incurred by the timing offset between the sidelink as well as the uplink and downlink when configuring the sidelink HARQ report, thus, the correct reception of sidelink HARQ report is ensured.

According to one aspect of the present disclosure, the above method is characterized in also comprising:

receiving second information;

herein, the second information is used to determine a second timing offset, the second timing offset is used to determine a timing offset between a timing of a first link and a timing of the second link, and the first information is used to indicate a relation between the first timing offset and the second timing offset; the second information is transmitted via an air interface.

In one embodiment, relation information between the first timing offset and the second timing offset is indicated through the first information, which reduces the header overhead of the first timing offset indication and can also effectively avoids the timing ambiguity of the sidelink HARQ report.

According to one aspect of the present disclosure, the above method is characterized in that for an SCS of a subcarrier occupied by the second signal in frequency domain, and a time length of a slot of the second link is equal to a first length; the first information is used to indicate an integer ratio between the first timing offset and the first length.

According to one aspect of the present disclosure, the above method is characterized in also comprising:

transmitting third information;

herein, the third information is used to indicate the reference delay, the reference delay is also related to an SCS of a subcarrier occupied by the second signaling in frequency domain, and the third information is transmitted via an air interface.

According to one aspect of the present disclosure, the above method is characterized in that the first signaling is used to determine a second delay, a first slot is an earliest slot comprising time-domain resources occupied by the first signal, and a start time of the first slot is not earlier than an end time for receiving the first signaling; for an SCS of a subcarrier occupied by the first signal in frequency domain, the first slot is an earliest slot satisfying that a length of a time interval between the start time of the first slot and the end time for receiving the first signaling is not less than the second delay.

According to one aspect of the present disclosure, the above method is characterized in that the first signaling is used to determine a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is one of an end time for receiving the first signaling, an end time for transmitting the first signal or an end time for receiving the second signaling.

In one embodiment, by defining a delay between the second signal in time domain and the reference time (that is, the third delay), the overhead of a signaling indicating the timing of the sidelink HARQ report is reduced.

The present disclosure provides a method in a second node for wireless communications, comprising:

transmitting a first signaling; and receiving a second signal;

herein, the first signaling is used to indicate time-frequency resources occupied by a first signal, the first signaling is used to indicate radio resources occupied by the second signal, and time-frequency resources occupied by the first signal are used to determine radio resources occupied by a second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the second signaling is a node other than the second node.

According to one aspect of the present disclosure, the above method is characterized in also comprising:

receiving first information;

herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first information is used to determine the first timing offset, and the reference link is one of the first link and the second link; the first information is transmitted via an air interface.

According to one aspect of the present disclosure, the above method is characterized in also comprising:

transmitting second information;

herein, the second information is used to indicate a second timing offset, the second timing offset is used to indicate a timing offset between a timing of the first link and a timing of the second link, and the first information is used to indicate a relation between the first timing offset and the second timing offset; the second information is transmitted via an air interface.

According to one aspect of the present disclosure, the above method is characterized in that for an SCS of a subcarrier occupied by the second signal in frequency domain, and a time length of a slot of the second link is equal to a first length; the first information is used to indicate an integer ratio between the first timing offset and the first length.

According to one aspect of the present disclosure, the above method is characterized in also comprising:

receiving third information;

herein, the third information is used to determine the reference delay, the reference delay is also related to an SCS of a subcarrier occupied by the second signaling in frequency domain, and the third information is transmitted via an air interface.

According to one aspect of the present disclosure, the above method is characterized in that the first signaling is used to indicate a second delay, a first slot is an earliest slot comprising time-domain resources occupied by the first signal, and a start time of the first slot is not earlier than an end time for receiving the first signaling; for an SCS of a subcarrier occupied by the first signal in frequency domain, the first slot is an earliest slot satisfying that a length of a time interval between the start time of the first slot and the end time for receiving the first signaling is not less than the second delay.

According to one aspect of the present disclosure, the above method is characterized in that the first signaling is used to indicate a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is one of an end time for receiving the first signaling, an end time for transmitting the first signal or an end time for receiving the second signaling.

The present disclosure provides a first node for wireless communications, comprising:
a first receiver, receiving a first signaling;
a first transmitter, transmitting a first signal;
a second receiver, receiving a second signaling; and
a second transmitter, transmitting a second signal;
herein, the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the first signaling is different from a transmitter of the second signaling.

The present disclosure provides a second node for wireless communications, comprising:
a third transmitter, transmitting a first signaling; and
a third receiver, receiving a second signal;
herein, the first signaling is used to indicate time-frequency resources occupied by a first signal, the first signaling is used to indicate radio resources occupied by the second signal, and time-frequency resources occupied by the first signal are used to determine radio resources occupied by a second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the second signaling is a node other than the second node.

In one embodiment, the method in the present disclosure is advantageous in the following aspects:
by adopting the method in the present disclosure, the capability of the UE can be designed for a reception of the sidelink HARQ, switching of sidelink and uplink and preparation of the sidelink HARQ report, which reduces the complexity of the product implementation of UEs of NR V2X.

by adopting the method in the present disclosure, the network side can acquire sidelink timing information, so as to avoid the timing ambiguity in the sidelink HARQ report between the UE and the base station incurred by the timing offset between the sidelink as well as the uplink and downlink when configuring the sidelink HARQ report, thus ensuring the correct reception of the sidelink HARQ report.

by adopting the method in the present disclosure, the delay between receiving the sidelink HARQ and reporting the sidelink HARQ to the network does not exceed the processing capacity of the UE, so as to ensure the successful transmission of the sidelink HARQ report.

by adopting the method in the present disclosure, it is supported to adjust a minimum delay of the sidelink HARQ report according to an SCS of a channel adopted by the sidelink HARQ report, so as to avoid introducing a large number of UE capability to report signaling, thus saving the header overhead.

by adopting the method in the present disclosure, it effectively avoids the timing ambiguity in the sidelink HARQ report and reduces the header overhead of reporting the sidelink timing at the same time.

by adopting the method in the present disclosure, a relative delay between the sidelink HARQ report and a PSSCH or PSFCH is defined to reduce the overhead of a signaling indicating the timing of the sidelink HARQ report.

BRIEF DESCRIPTION OF THE DRAWINGS

Other features, objects and advantages of the present disclosure will become more apparent from the detailed description of non-restrictive embodiments taken in conjunction with the following drawings:

FIG. 7 illustrates a schematic diagram of a first timing offset according to one embodiment of the present disclosure;

FIG. 8 illustrates a schematic diagram of a second timing offset according to one embodiment of the present disclosure;

FIG. 9 illustrates a schematic diagram of a relation between a first length and a first timing offset according to one embodiment of the present disclosure;

FIG. 10 illustrates a schematic diagram of a reference delay according to one embodiment of the present disclosure;

FIG. 11 illustrates a schematic diagram of a first slot according to one embodiment of the present disclosure;

FIG. 12 illustrates a schematic diagram of a second slot according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
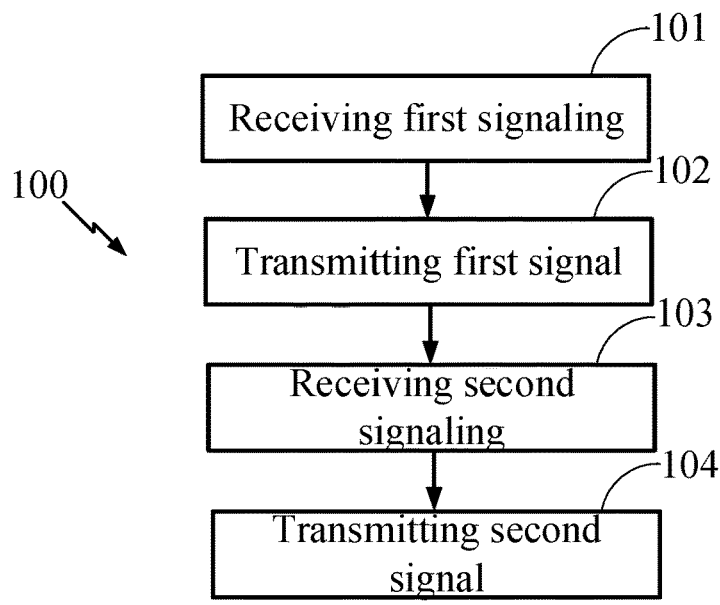
FIG. 1 illustrates a flowchart of a first signaling, a first signal, a second signaling and a second signal according to one embodiment of the present disclosure.

Embodiment 1 illustrates a flowchart of a first signaling, a first signal, a second signaling and a second signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives a first signaling in step 101; transmits a first signal in step 102; receives a second signaling in step 103; and transmits a second signal in step 104; herein, the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the first signaling is different from a transmitter of the second signaling.

In one embodiment, the first signaling is a baseband signal.

In one embodiment, the first signaling is a Radio Frequency (RF) signal.

In one embodiment, the first signaling is transmitted via an air interface.

In one embodiment, the first signaling is transmitted via a radio interface.

In one embodiment, the first signaling is transmitted via a PC5 interface.

In one embodiment, the first signaling is transmitted via a Uu interface.

In one embodiment, the first signaling is transmitted through sidelink.

In one embodiment, the first signaling is transmitted through downlink.

In one embodiment, the first signaling is a physical-layer signaling.

In one embodiment, the first signaling is a dynamic signaling.

In one embodiment, the first signaling carries Downlink Control Information (DCI).

In one embodiment, the first signaling carries Sidelink Control Information (SCI).

In one embodiment, the first signaling is a Physical Downlink Control Channel (PDCCH).

In one embodiment, the first signaling is a Physical Sidelink Control Channel (PSCCH).

In one embodiment, the first signaling is UE-Specific.

In one embodiment, the first signaling is Cell-Specific.

In one embodiment, the first signaling is transmitted through a Physical Downlink Control Channel (PDCCH) scrambled by a UE-Specific Radio Network Temporary Identity (RNTI).

In one embodiment, the first signaling is transmitted through a Physical Downlink Control Channel (PDCCH) scrambled by an SL-SPS-V-RNTI.

In one embodiment, the first signaling is transmitted through a Physical Downlink Control Channel (PDCCH) scrambled by an SL-V-RNTI.

In one embodiment, the first signaling is transmitted via an air interface.

In one embodiment, the first signaling is transmitted via a radio interface.

In one embodiment, the first signaling is transmitted via a PC5 interface.

In one embodiment, the first signaling is transmitted via a Uu interface.

In one embodiment, the first signaling is transmitted through sidelink.

In one embodiment, the first signaling is carried by a baseband signal.

In one embodiment, the first signaling is carried by a Radio-Frequency (RF) signal.

In one embodiment, the first signaling is a Radio Resource Control (RRC) signaling.

In one embodiment, the first signaling is a higher-layer signaling.

In one embodiment, a DCI format adopted by the first signaling is format 3.

In one embodiment, the first signaling is used to configure sidelink transmission.

In one embodiment, the above phrase of "the first signaling being used to determine time-frequency resources occupied by the first signal" includes the following meaning: the first signaling is used by the first node in the present disclosure to determine time-frequency resources occupied by the first signal.

In one embodiment, the above phrase of "the first signaling being used to determine time-frequency resources occupied by the first signal" includes the following meaning: the first signaling is used to directly indicate time-frequency resources occupied by the first signal.

In one embodiment, the above phrase of "the first signaling being used to determine time-frequency resources occupied by the first signal" includes the following meaning: the first signaling is used to indirectly indicate time-frequency resources occupied by the first signal.

In one embodiment, the above phrase of "the first signaling being used to determine time-frequency resources occupied by the first signal" includes the following meaning: the first signaling is used to explicitly indicate time-frequency resources occupied by the first signal.

In one embodiment, the above phrase of "the first signaling being used to determine time-frequency resources occupied by the first signal" includes the following meaning: the first signaling is used to implicitly indicate time-frequency resources occupied by the first signal.

In one embodiment, the first signaling is also used to determine a Modulation Coding Scheme (MCS) adopted by the first signal.

In one embodiment, the first signaling is also used to determine a HARQ process to which the first signal belongs.

In one embodiment, the above phrase of "the first signaling being used to determine radio resources occupied by the second signal" includes the following meaning: the first signaling is used by the first node in the present disclosure to determine radio resources occupied by the second signal.

In one embodiment, the above phrase of "the first signaling being used to determine radio resources occupied by the second signal" includes the following meaning: the first signaling is used to directly indicate radio resources occupied by the second signal.

In one embodiment, the above phrase of "the first signaling being used to determine radio resources occupied by the second signal" includes the following meaning: the first signaling is used to indirectly indicate radio resources occupied by the second signal.

In one embodiment, the above phrase of "the first signaling being used to determine radio resources occupied by the second signal" includes the following meaning: the first signaling is used to explicitly indicate radio resources occupied by the second signal.

In one embodiment, the above phrase of "the first signaling being used to determine radio resources occupied by the second signal" includes the following meaning: the first signaling is used to implicitly indicate radio resources occupied by the second signal.

In one embodiment, the above phrase of "the first signaling being used to determine time-frequency resources occupied by the first signal" includes the following meaning: the first signaling is used to determine time-domain resources occupied by the first signal.

In one embodiment, the above phrase of "the first signaling being used to determine time-frequency resources occupied by the first signal" includes the following meaning: the first signaling is used to determine frequency-domain resources occupied by the first signal.

In one embodiment, the above phrase of "the first signaling being used to determine time-frequency resources occupied by the first signal" includes the following meaning: the first signaling is used to determine time-domain resources and frequency-domain resources occupied by the first signal.

In one embodiment, the above phrase of "the first signaling being used to determine time-frequency resources occupied by the first signal" includes the following meaning: the first signaling is used to determine a start time of time-domain resources occupied by the first signal.

In one embodiment, the above phrase of "the first signaling being used to determine time-frequency resources occupied by the first signal" includes the following meaning: a length of a time interval between a start time of time-domain resources comprised in time-frequency resources occupied by the first signal and an end time for receiving the first signaling is predefined.

In one embodiment, the above phrase of "the first signaling being used to determine time-frequency resources occupied by the first signal" includes the following meaning: a length of a time interval between a start time of time-domain resources comprised in time-frequency resources occupied by the first signal and an end time for receiving the first signaling is fixed.

In one embodiment, the above phrase of "the first signaling being used to determine time-frequency resources occupied by the first signal" includes the following meaning: the first signaling is used to indicate a delay between a start time of time-domain resources comprised in time-frequency resources occupied by the first signal and an end time for receiving the first signaling.

In one embodiment, the above phrase of "the first signaling being used to determine radio resources occupied by the second signal" includes the following meaning: the first signaling is used to determine time-domain resources occupied by the second signal.

In one embodiment, the above phrase of "the first signaling being used to determine radio resources occupied by the second signal" includes the following meaning: the first signaling is used to determine frequency-domain resources occupied by the second signal.

In one embodiment, the above phrase of "the first signaling being used to determine radio resources occupied by the second signal" includes the following meaning: the first signaling is used to determine code-domain resources occupied by the second signal.

In one embodiment, the above phrase of "the first signaling being used to determine radio resources occupied by the second signal" includes the following meaning: the first signaling is used to determine a sequence generating the second signal.

In one embodiment, the above phrase of "the first signaling being used to determine radio resources occupied by the second signal" includes the following meaning: the first signaling is used to determine time-domain resources and frequency-domain resources occupied by the second signal.

In one embodiment, the above phrase of "the first signaling being used to determine radio resources occupied by the second signal" includes the following meaning: the first signaling is used to determine time-domain resources and code-domain resources occupied by the second signal.

In one embodiment, the above phrase of "the first signaling being used to determine radio resources occupied by the second signal" includes the following meaning: the first signaling is used to determine frequency-domain resources and code-domain resources occupied by the second signal.

In one embodiment, the above phrase of "the first signaling being used to determine radio resources occupied by the second signal" includes the following meaning: the first signaling is used to determine time-domain resources occupied by the second signal and a sequence generating the second signal.

In one embodiment, the above phrase of "the first signaling being used to determine radio resources occupied by the second signal" includes the following meaning: the first signaling is used to determine frequency-domain resources occupied by the second signal and a sequence generating the second signal.

In one embodiment, the above phrase of "the first signaling being used to determine radio resources occupied by the second signal" includes the following meaning: the first signaling is used to determine frequency-domain resources, time-domain resources and code-domain resources occupied by the second signal.

In one embodiment, the above phrase of "the first signaling being used to determine radio resources occupied by the second signal" includes the following meaning: the first signaling is used to determine frequency-domain resources, time-domain resources occupied by the second signal and a sequence generating the second signal.

In one embodiment, the above phrase of "the first signaling being used to determine time-frequency resources occupied by the second signal" includes the following meaning:

the first signaling is used to determine a start time of time-domain resources occupied by the second signal.

In one embodiment, the above phrase of "the first signaling being used to determine time-frequency resources occupied by the second signal" includes the following meaning: a length of a time interval between a start time of time-domain resources comprised in time-frequency resources occupied by the second signal and an end time for receiving the first signaling is predefined.

In one embodiment, the above phrase of "the first signaling being used to determine time-frequency resources occupied by the second signal" includes the following meaning: a length of a time interval between a start time of time-domain resources comprised in time-frequency resources occupied by the second signal and an end time for receiving the first signaling is fixed.

In one embodiment, the above phrase of "the first signaling being used to determine time-frequency resources occupied by the second signal" includes the following meaning: the first signaling is used to indicate a delay between a start time of time-domain resources comprised in time-frequency resources occupied by the second signal and an end time for receiving the first signaling.

In one embodiment, radio resources occupied by the second signal comprise time-frequency resources occupied by the second signal and code-domain resources occupied by the second signal.

In one embodiment, radio resources occupied by the second signal comprise time-frequency resources occupied by the second signal.

In one embodiment, radio resources occupied by the second signal comprise code-domain resources occupied by the second signal.

In one embodiment, radio resources occupied by the second signal comprise time-frequency resources occupied by the second signal and sequence resources generating the second signal.

In one embodiment, radio resources occupied by the second signal comprise sequence resources generating the second signal.

In one embodiment, the above phrase of "time-frequency resources occupied by the first signal being used to determine radio resources occupied by the second signaling" includes the following meaning: time-frequency resources occupied by the first signal are used by a first node in the present disclosure to determine radio resources occupied by the second signaling.

In one embodiment, the above phrase of "time-frequency resources occupied by the first signal being used to determine radio resources occupied by the second signaling" includes the following meaning: time-frequency resources occupied by the first signal are used to determine time-frequency resources occupied by the second signaling.

In one embodiment, the above phrase of "time-frequency resources occupied by the first signal being used to determine radio resources occupied by the second signaling" includes the following meaning: time-frequency resources occupied by the first signal are used to determine code-domain resources occupied by the second signaling.

In one embodiment, the above phrase of "time-frequency resources occupied by the first signal being used to determine radio resources occupied by the second signaling" includes the following meaning: time-frequency resources occupied by the first signal are used to determine sequence resources generating the second signaling.

In one embodiment, the above phrase of "time-frequency resources occupied by the first signal being used to determine radio resources occupied by the second signaling" includes the following meaning: time-frequency resources occupied by the first signal are used to determine time-frequency resources occupied by the second signaling and sequence resources generating the second signaling.

In one embodiment, the above phrase of "time-frequency resources occupied by the first signal being used to determine radio resources occupied by the second signaling" includes the following meaning: time-frequency resources occupied by the first signal are used to determine time-frequency resources occupied by the second signaling and code-domain resources occupied by the second signaling.

In one embodiment, the above phrase of "time-frequency resources occupied by the first signal being used to determine radio resources occupied by the second signaling" includes the following meaning: time-frequency resources occupied by the first signal are used to determine radio resources occupied by the second signaling according to a mapping relation.

In one embodiment, the above phrase of "time-frequency resources occupied by the first signal being used to determine radio resources occupied by the second signaling" includes the following meaning: time-frequency resources occupied by the first signal are used to determine radio resources occupied by the second signaling according to a corresponding relation.

In one embodiment, the above phrase of "time-frequency resources occupied by the first signal being used to determine radio resources occupied by the second signaling" includes the following meaning: time-frequency resources occupied by the first signal are used to determine radio resources occupied by the second signaling according to an implicit relation.

In one embodiment, the above phrase of "time-frequency resources occupied by the first signal being used to determine radio resources occupied by the second signaling" includes the following meaning: radio resources occupied by the second signaling are associated with time-frequency resources occupied by the first signal.

In one embodiment, the first signal is a baseband signal.

In one embodiment, the first signal is a radio frequency (RF) signal.

In one embodiment, the first signal is transmitted via an air interface.

In one embodiment, the first signal is transmitted via a radio interface.

In one embodiment, the first signal is transmitted via a PC5 interface.

In one embodiment, the first signal is transmitted via a Uu interface.

In one embodiment, the first signal is transmitted through sidelink.

In one embodiment, the first signal is used to carry a Transport Block (TB) carrying sidelink.

In one embodiment, the first signal is transmitted through a Sidelink Shared Channel (SL-SCH).

In one embodiment, the first signal is transmitted through a Physical Sidelink Shared Channel (PSSCH).

In one embodiment, the first signal is transmitted through a Physical Uplink Shared Channel (PUSCH).

In one embodiment, the first signal is transmitted through a PSCCH.

In one embodiment, the first signal carries SCI.

In one embodiment, the first signal is broadcast.

In one embodiment, the first signal is unicast.

In one embodiment, the first signal is groupcast.

In one embodiment, all or part of a Transport Block is used to generate the first signal.

In one embodiment, all or partial bits in a Transport Block (TB) sequentially goes through CRC Calculation, Channel Coding, Rate Matching, Scrambling, Modulation, Layer Mapping, Antenna Port Mapping, Mapping to Virtual Resource Blocks, Mapping from Virtual to Physical Resource Blocks, Orthogonal Frequency Division Multiplexing (OFDM) Baseband Signal Generation and Modulation and Upconversion to obtain the first signal.

In one embodiment, all or partial bits in a TB sequentially goes through CRC Calculation, Channel Coding, Rate Matching, Scrambling, Modulation, Layer Mapping, Antenna Port Mapping, Mapping to Virtual Resource Blocks, Mapping from Virtual to Physical Resource Blocks and OFDM Baseband Signal Generation to obtain the first signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Antenna Port Mapping, Mapping to Virtual Resource Blocks, Mapping from Virtual to Physical Resource Blocks, OFDM Baseband Signal Generation and Modulation and Upconversion to obtain the first signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Antenna Port Mapping, Mapping to Virtual Resource Blocks, Mapping from Virtual to Physical Resource Blocks and OFDM Baseband Signal Generation to obtain the first signal.

In one embodiment, all or partial bits in a payload of an SCI sequentially goes through CRC Calculation, Channel Coding, Rate Matching, Scrambling, Modulation, Mapping to Physical Resources, OFDM Baseband Signal Generation, and Modulation and Upconversion to obtain the first signal.

In one embodiment, all or partial bits in a payload of an SCI sequentially goes through CRC Calculation, Channel Coding, Rate Matching, Scrambling, Modulation, Mapping to Physical Resources and OFDM Baseband Signal Generation to obtain the first signal.

In one embodiment, the second signaling is a baseband signal.

In one embodiment, the second signaling is an RF signal.

In one embodiment, the second signaling is transmitted via an air interface.

In one embodiment, the second signaling is transmitted via a radio interface.

In one embodiment, the second signaling is transmitted via a PC5 interface.

In one embodiment, the second signaling is transmitted via a Uu interface.

In one embodiment, the second signaling is transmitted through sidelink.

In one embodiment, the second signaling is transmitted through a Physical Sidelink Feedback Channel (PSFCH).

In one embodiment, all or part of a characteristic sequence is used to generate the second signaling.

In one embodiment, all or part of a Zadoff-Chu (ZC) sequence is used to generate the second signaling.

In one embodiment, the second signaling carries all or part of Sidelink Feedback Control Information (SFCI).

In one embodiment, the second signaling carries Channel Status Information (CSI) of sidelink.

In one subembodiment, the second signaling carries a Channel Quality Indicator (CQI) of sidelink.

In one embodiment, the second signaling carries a Rank Indicator (RI) of sidelink.

In one embodiment, the second signaling carries a Reference Signal Received Power (RSRP) report of sidelink.

In one embodiment, the second signaling carries a Reference Signal Received Quality (RSRQ) report of sidelink.

In one embodiment, the second signaling carries a Layer 1-Reference Signal Received Power (L1-RSRP) report of sidelink.

In one embodiment, the second signaling carries a HARQ feedback.

In one embodiment, the second signaling carries a HARQ Non-Acknowledge (NACK) feedback.

In one embodiment, the second signaling is used to determine whether the first signal is correctly received.

In one embodiment, the second signaling is used to indicate whether the first signal is correctly received.

In one embodiment, the second signaling is used to indicate that the first signal is not correctly received.

In one embodiment, the second signaling carries a HARQ feedback carrying the first signal.

In one embodiment, the second signaling carries a HARQ NACK feedback carrying the first signal.

In one embodiment, the second signal is a baseband signal.

In one embodiment, the second signal is an RF signal.

In one embodiment, the second signal is transmitted via an air interface.

In one embodiment, the second signal is transmitted via a radio interface.

In one embodiment, the second signal is transmitted via a PC5 interface.

In one embodiment, the second signal is transmitted via a Uu interface.

In one embodiment, the second signal is transmitted through uplink.

In one embodiment, the second signal is transmitted through a Physical Uplink Control Channel (PUCCH).

In one embodiment, the second signal is transmitted through a Physical Uplink Shared Channel (PUSCH).

In one embodiment, the second signal is transmitted through an Uplink Shared Channel (UL-SCH).

In one embodiment, the second signal is a PUSCH piggybacking UCI.

In one embodiment, all or part of a characteristic sequence is used to generate the second signal.

In one embodiment, the second signal carries all or part of Uplink Control Information (UCI).

In one embodiment, the second signal carries a HARQ feedback.

In one embodiment, the second signal carries a sidelink HARQ feedback.

In one embodiment, all or part of a TB is used to generate the second radio signal.

In one embodiment, all or partial bits in a TB sequentially goes through CRC Calculation, Channel Coding, Rate Matching, Scrambling, Modulation, Layer Mapping, precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Channel Coding, Rate Matching, Scrambling, Modulation, Layer Mapping, Transform Precoding, Precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Channel Coding, Rate Matching, Scrambling, Modulation, Layer Mapping, precoding, Mapping to Virtual Resource Blocks, Mapping from Virtual to Physical Resource Blocks and OFDM Baseband Signal Generation to obtain the second signal.

In one embodiment, all or partial bits in a TB sequentially goes through CRC Calculation, Channel Coding, Rate Matching, Scrambling, Modulation, Layer Mapping, transform precoding, precoding, Mapping to Virtual Resource Blocks, Mapping from Virtual to Physical Resource Blocks and OFDM Baseband Signal Generation to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Precoding, Mapping to Virtual Resource Blocks, Mapping from Virtual to Physical Resource Blocks and OFDM Baseband Signal Generation to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Transform Precoding, Precoding, Mapping to Virtual Resource Blocks, Mapping from Virtual to Physical Resource Blocks and OFDM Baseband Signal Generation to obtain the second signal.

In one embodiment, all or partial bits in a payload of a UCI sequentially goes through Sequence Generation, Mapping to Physical Resources, OFDM Baseband Signal Generation and Modulation and Upconversion to obtain the second signal.

In one embodiment, all or partial bits in a payload of a UCI sequentially goes through Sequence Generation, Mapping to Physical Resources and OFDM Baseband Signal Generation to obtain the second signal.

In one embodiment, all or partial bits in a payload of a UCI sequentially goes through CRC Calculation, Channel Coding, Rate Matching, Scrambling, Modulation, Blockwise Spreading, Mapping to Physical Resources, OFDM Baseband Signal Generation and Modulation and Upconversion to obtain the second signal.

In one embodiment, all or partial bits in a payload of a UCI sequentially goes through CRC Calculation, Channel Coding, Rate Matching, Scrambling, Modulation, Blockwise Spreading, Transform Precoding, Mapping to Physical Resources, OFDM Baseband Signal Generation and Modulation and Upconversion to obtain the second signal.

In one embodiment, all or partial bits in a payload of a UCI sequentially goes through CRC Calculation, Channel Coding, Rate Matching, Scrambling, Modulation, Blockwise Spreading, Mapping to Physical Resources and OFDM Baseband Signal Generation to obtain the second signal.

In one embodiment, all or partial bits in a payload of a UCI sequentially goes through CRC Calculation, Channel Coding, Rate Matching, Scrambling, Modulation, Blockwise Spreading, Transform Precoding, Mapping to Physical Resources and OFDM Baseband Signal Generation to obtain the second signal.

In one embodiment, a payload of a UCI and a TB are used together to generate the second signal.

In one embodiment, radio resources occupied by the second signaling comprise time-frequency resources occupied by the second signaling and code-domain resources occupied by the second signaling.

In one embodiment, radio resources occupied by the second signaling comprise time-frequency resources occupied by the second signaling.

In one embodiment, radio resources occupied by the second signaling comprise code-domain resources occupied by the second signaling.

In one embodiment, radio resources occupied by the second signaling comprise time-frequency resources occupied by the second signaling and sequence resources generating the second signaling.

In one embodiment, radio resources occupied by the second signaling comprise sequence resources generating the second signaling.

In one embodiment, the first delay is measured by s.

In one embodiment, the first delay is measured by ms.

In one embodiment, the first delay is equal to a time length of at least one OFDM symbol.

In one embodiment, the first delay is equal to a time length of at least one slot.

In one embodiment, the first delay is equal to a positive integral multiple of Tc, where $Tc=1/(480000*4096)$ s.

In one embodiment, the first delay is represented by a number of OFDM symbols.

In one embodiment, the first delay is represented by a number of slots.

In one embodiment, the first delay is equal to a time length of at least one OFDM symbol, and the OFDM symbol corresponds to an SCS of a subcarrier occupied by the second signal in frequency domain.

In one embodiment, the first delay is equal to a time length of at least one slot, and the slot corresponds to an SCS of a subcarrier occupied by the second signal in frequency domain.

In one embodiment, the first delay is equal to a time length of at least one OFDM symbol, and the OFDM symbol corresponds to an SCS of a subcarrier occupied by the second signaling in frequency domain.

In one embodiment, the first delay is equal to a time length of at least one slot, and the slot corresponds to an SCS of a subcarrier occupied by the second signaling in frequency domain.

In one embodiment, the reference delay is measured by s.

In one embodiment, the reference delay is measured by ms.

In one embodiment, the reference delay is equal to a time length of at least one OFDM symbol.

In one embodiment, the reference delay is equal to a time length of at least one slot.

In one embodiment, the reference delay is equal to a positive integral multiple of Tc, where Tc=1/(480000*4096) s.

In one embodiment, the reference delay is represented by a number of OFDM symbols.

In one embodiment, the reference delay is represented by a number of slots.

In one embodiment, the reference delay is equal to a time length of at least one OFDM symbol, and the OFDM symbol corresponds to an SCS of a subcarrier occupied by the second signal in frequency domain.

In one embodiment, the reference delay is equal to a time length of an integral number of OFDM symbol(s) other than an earliest OFDM symbol in a slot.

In one embodiment, the reference delay is equal to a time length of at least one slot, and the slot corresponds to an SCS of a subcarrier occupied by the second signal in frequency domain.

In one embodiment, the reference delay is equal to a time length of at least one OFDM symbol, and the OFDM symbol corresponds to an SCS of a subcarrier occupied by the second signaling in frequency domain.

In one embodiment, the reference delay is equal to a time length of at least one slot, and the slot corresponds to an SCS of a subcarrier occupied by the second signaling in frequency domain.

In one embodiment, the first delay is greater than the reference delay.

In one embodiment, the first delay is equal to the reference delay.

In one embodiment, an SCS of a subcarrier occupied by the second signal in frequency domain is equal to one of 15 kHz, 30 kHz, 60 kHZ, 120 kHz and 240 kHz.

In one embodiment, SCSs of all subcarriers occupied by the second signal in frequency are equal.

In one embodiment, the reference delay is also related to an SCS of a subcarrier occupied by the second signaling in frequency domain.

In one embodiment, the above phrase of "the reference delay being related to an SCS of a subcarrier occupied by the second signal in frequency domain" includes the following meaning: an SCS of a subcarrier occupied by the second signal in frequency domain is equal to a first spacing, an SCS of a subcarrier occupied by the second signaling is equal to a second spacing, and the reference delay is related to a smaller one between the first spacing and the second spacing.

In one embodiment, the above phrase of "the reference delay being related to an SCS of a subcarrier occupied by the second signal in frequency domain" includes the following meaning: the reference delay is related to an index of an SCS of a subcarrier occupied by the second signal in frequency domain.

In one embodiment, the above phrase of "the reference delay being related to an SCS of a subcarrier occupied by the second signal in frequency domain" includes the following meaning: an index of an SCS of a subcarrier occupied by the second signal in frequency domain is used to determine the reference delay.

In one embodiment, the above phrase of "the reference delay being related to an SCS of a subcarrier occupied by the second signal in frequency domain" includes the following meaning: an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a smaller one between the first index and the second index.

In one embodiment, the above phrase of "the reference delay being related to an SCS of a subcarrier occupied by the second signal in frequency domain" includes the following meaning: an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a greater one between the first index and the second index.

In one embodiment, the above phrase of "the reference delay being related to an SCS of a subcarrier occupied by the second signal in frequency domain" includes the following meaning: an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and a smaller one between the first index and the second index is used to determine the reference delay.

In one embodiment, the above phrase of "the reference delay being related to an SCS of a subcarrier occupied by the second signal in frequency domain" is implemented through the following formula:

$$D_{reference} = N_4 \cdot (2048 + 144) \cdot \kappa \cdot 2^{-\mu} \cdot T_C$$

Herein, $D_{reference}$ represents the reference delay, $\mu$ represents an index of an SCS of a subcarrier occupied by the second signal in frequency domain, $T_c=1/(480000*4096)$ s, $\kappa=64$, and $N_4$ is a value related to $\mu$.

In one embodiment, the above phrase of "the reference delay being related to an SCS of a subcarrier occupied by the second signal in frequency domain" is implemented through the following formula:

$$D_{reference} = N_4 \cdot (2048 + 144) \cdot \kappa \cdot 2^{-\mu} \cdot T_C$$

herein, an SCS of a subcarrier occupied by the second signal in frequency domain is a first index, and an index of an SCS of a subcarrier occupied by the second signaling in frequency domain is a second index, the first index is a non-negative integer, the second index is a non-negative integer; $D_{reference}$ represents the reference delay, $\mu$ represents a smaller one between the first index and the second index, $T_c=1/(480000*4096)$s, $\kappa=64$, and $N_4$ is a value related to $\mu$.

In one embodiment, the above phrase of "the reference delay being related to an SCS of a subcarrier occupied by the second signal in frequency domain" is implemented through the following formula:

$$D_{reference} = N_4 \cdot (2048 + 144) \cdot \kappa \cdot 2^{-\mu} \cdot T_C$$

herein, an SCS of a subcarrier occupied by the second signal in frequency domain is a first index, and an index of an SCS of a subcarrier occupied by the second signaling in frequency domain is a second index, the first index being a non-negative integer, the second index being a non-negative integer; $D_{reference}$ represents the reference delay, μ represents a greater $D_{reference}$ index one between the first index and the second index, $T_c=1/(480000*4096)$s, κ=64, and $N_4$ is a value related to μ.

In one embodiment, information carried by the second signal comprises a sidelink HARQ report.

In one embodiment, information carried by the second signal comprises information on whether the first signal is correctly received.

In one embodiment, information carried by the second signal comprises information on whether the first signal is not correctly received.

In one embodiment, information carried by the second signal comprises information on whether a TB carried by the first signal needs to be retransmitted.

In one embodiment, information carried by the second signal comprises information on whether a TB carried by the first signal needs to be re-scheduled.

In one embodiment, the above phrase of "the second signaling being used to determine information carried by the second signal" includes the following meaning: information carried by the second signal comprises information carried by the second signal.

In one embodiment, the above phrase of "the second signaling being used to determine information carried by the second signal" includes the following meaning: information carried by the second signal copies information carried by the second signal.

In one embodiment, the above phrase of "the second signaling being used to determine information carried by the second signal" includes the following meaning: the second signaling is used to determine whether the first signal is correctly received, and information carried by the second signal comprises an indication of whether the first signal is correctly received.

In one embodiment, the above phrase of "the second signaling being used to determine information carried by the second signal" includes the following meaning: information carried by the second signal is the same as information carried by the second signaling.

In one embodiment, the above phrase of "the second signaling being used to determine information carried by the second signal" includes the following meaning: information carried by the second signal is the same as HARQ-ACK information carried by the second signaling.

In one embodiment, the above phrase of "the second signaling being used to determine information carried by the second signal" includes the following meaning: information carried by the second signal comprises HARQ-ACK information carried by the second signaling.

In one embodiment, the above phrase of "the second signaling being used to determine information carried by the second signal" includes the following meaning: information carried by the second signaling is used to generate information carried by the second signal.

In one embodiment, a transmitter of the first signaling is a base station.

In one embodiment, a transmitter of the first signaling is a Transmission Reception Point (TRP).

In one embodiment, a transmitter of the first signaling is a network device.

In one embodiment, a transmitter of the first signaling is gNB.

In one embodiment, a transmitter of the first signaling is eNB.

In one embodiment, a transmitter of the first signaling is a UE.

In one embodiment, a transmitter of the first signaling is a Road Side Unit (RSU).

In one embodiment, a transmitter of the first signaling is the second node in the present disclosure.

In one embodiment, a transmitter of the second signaling is a base station.

In one embodiment, a transmitter of the second signaling is a TRP.

In one embodiment, a transmitter of the second signaling is a network device.

In one embodiment, a transmitter of the second signaling is gNB.

In one embodiment, a transmitter of the second signaling is eNB.

In one embodiment, a transmitter of the second signaling is a UE.

In one embodiment, a transmitter of the second signaling is an RSU.

In one embodiment, a transmitter of the second signaling is a node other than the second node in the present disclosure.

In one embodiment, the above phrase of "a transmitter of the first signaling being different from a transmitter of the second signaling" includes the following meaning: the first signaling and the second signaling are transmitted via different radio interfaces.

In one embodiment, the above phrase of "a transmitter of the first signaling being different from a transmitter of the second signaling" includes the following meaning: the first signaling and the second signaling are transmitted through different links.

In one embodiment, the above phrase of "a transmitter of the first signaling being different from a transmitter of the second signaling" includes the following meaning: the first signaling is transmitted through a Uu interface, and the second signaling is transmitted via a PC5 interface.

In one embodiment, the above phrase of "a transmitter of the first signaling being different from a transmitter of the second signaling" includes the following meaning: the first signaling is transmitted through downlink, and the second signaling is transmitted through sidelink.

In one embodiment, the above phrase of "a transmitter of the first signaling being different from a transmitter of the second signaling" includes the following meaning: a transmitter of the first signaling and a transmitter of the third signaling are non-co-located.

In one embodiment, the above phrase of "a transmitter of the first signaling being different from a transmitter of the second signaling" includes the following meaning: node types of a transmitter of the first signaling and a transmitter of the second signaling are different.

In one embodiment, the above phrase of "a transmitter of the first signaling being different from a transmitter of the second signaling" includes the following meaning: a transmitter of the first signaling is a base station, and a transmitter of the second signaling is a UE.

In one embodiment, the above phrase of "a transmitter of the first signaling being different from a transmitter of the second signaling" includes the following meaning: a transmitter of the first signaling is a gNB/eNB, and a transmitter of the second signaling is an RSU.

Embodiment 2

Figure 2:
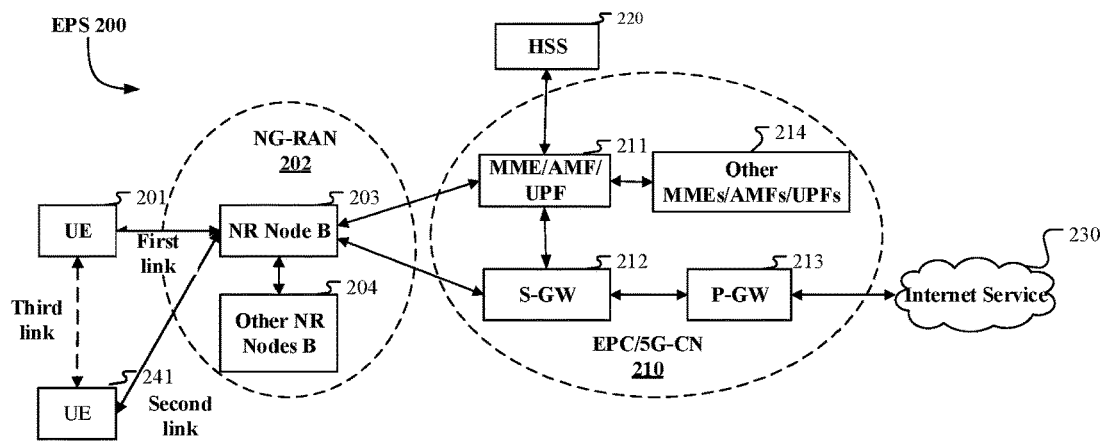
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LIE), and Long-Term Evolution Advanced (LIE-A) systems. The 5G NR or LIE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellites or a Road Side Unit (RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an SING interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports transmission in sidelink.

In one embodiment, the UE 201 supports a PC5 interface.

In one embodiment, the UE 201 supports Internet of Vehicles (IoVs).

In one embodiment, the UE 201 supports V2X traffic.

In one embodiment, the gNB 201 corresponds to the second node in the present disclosure.

In one embodiment, the gNB 201 supports IoVs.

In one embodiment, the gNB 201 supports V2X traffic.

Embodiment 3

Figure 3:
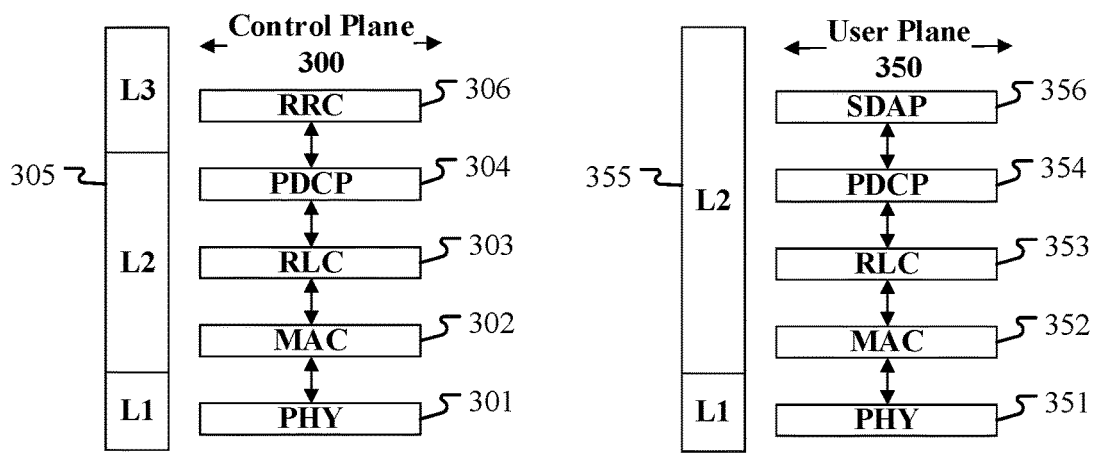
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or vehicle equipment or vehicle-mounted communication module in V2X) and a second node (gNB, UE or vehicle equipment or vehicle-mounted communication module in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signaling in the present disclosure is generated by the RRC 306.

In one embodiment, the second signaling in the present disclosure is generated by the MAC 302 or the MAC 352.

In one embodiment, the second signaling in the present disclosure is generated by the PHY 301 or the PHY 351.

In one embodiment, the second signal in the present disclosure is generated by the MAC 302 or the MAC 352.

In one embodiment, the second signal in the present disclosure is generated by the PHY 301 or the PHY 351.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

Embodiment 4

Figure 4:
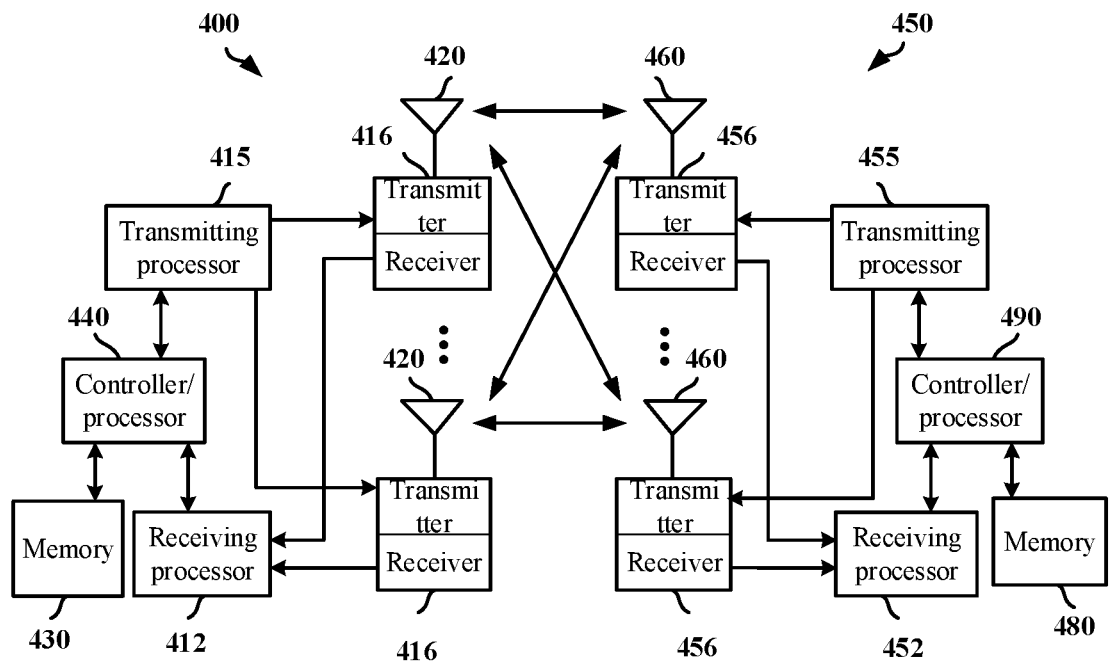
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460. The data source/buffer 480 provides a higher-layer packet to the controller/processor 490, the controller/processor 490 provides header compression and decompression, encryption and decryption, packet segmentation and reordering and multiplexing and de-multiplexing between a logical channel and a transport channel so as to implement the L2 layer and above layer protocols used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling, the receiving processor 452 performs various signal receiving processing functions used for the L1 layer (that is, PHY), including decoding, de-interleaving, descrambling, demodulation, de-precoding and extraction of physical layer control signaling. The transmitter 456 is configured to convert a baseband signal provided by the transmitting processor 455 into an RF signal to be transmitted via the antenna 460. The receiver 456 converts the RF signal received via the antenna 460 into a baseband signal and provides the baseband signal to the receiving processor 452.

The second node (410) may comprise a controller/processor 440, a data source/buffer 430, a receiving processor 412, a transmitter/receiver 416 and a transmitting processor 415, wherein the transmitter/receiver 416 comprises an antenna 420. The data source/buffer 430 provides a higher layer packet to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH or SL-SCH. The transmitting processor 415 provides various signal transmitting processing functions used for the L1 layer (that is, PHY), including coding, interleaving, scrambling, modulation, power control/allocation, precoding and physical layer control signaling (including synchronization signal and reference signal) generation. The receiving processor 412 provides various signaling receiving processing functions used for the L1 layer (i.e., PHY), including decoding, de-interleaving, descrambling, demodulation, de-precoding and extraction of physical layer signaling. The transmitter 416 is configured to convert a baseband signal provided by the transmitting processor 415 into an RF signal to be transmitted via the antenna 420. The receiver 416 converts the RF signal received via the antenna 420 into a baseband signal and provides the baseband signal to the receiving processor 412.

In Downlink, a higher-layer packet, such as high-layer information comprised in the second information and the first signaling (if higher-layer information is comprised in the first signaling) in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, the second information and the first signaling in the present disclosure (if higher layer information is comprised in the first signaling) are all generated in the controller/processor 440. The transmitting processor 415 implements various signal processing functions on the L1 layer (i.e., physical layer), including coding, interleaving, scrambling, modulation, power control/distribution, precoding, and generation of a physical-layer control signaling, etc. The generation of a physical layer signal carrying the second information and the first signaling in the present disclosure is completed by the transmitting processor 415, and the generated modulation symbols are divided into parallel streams and each stream is mapped to a corresponding multi-carrier subcarrier and/or a multi-carrier symbol, which are then transmitted in the form of an RF signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing function includes receiving a physical layer signal carrying the second information and the first signaling in the present disclosure, demodulating based on various modulation schemes (e.g., BPSK, and QPSK) via a multicarrier symbol in a multicarrier symbol stream, then descrambling, decoding and de-interleaving to recover data or a control signal transmitted by the second node 410 on a physical channel, and providing the data and the control signal to the controller/processor 490. The controller/processor 490 is in charge of the function of L2 layer and above layers, and the controller/processor 490 interprets the second information and the first signaling (if higher layer information is comprised in the first signaling) in the present disclosure. The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, retransmission of a lost packet, and a signaling to the second node 410. The first information, the third information and the second signal (when the second signal carries higher layer data) is generated at the data source/buffer 480 or the controller/processor 490. The transmitting processor 455 provides various signal transmitting processing functions for the L1 layer (that is, PHY). The generation of a physical layer signal carrying the first information, the third information and the second signal in the present disclosure is completed in the transmitting processor 415. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the first information, the third information and the second signal, the signal receiving and processing function includes acquisition of multi-carrier symbol streams, demodulation based on each modulation scheme (i.e., BPSK, QPSK), then the decoding and de-interleaving to recover data and/or node 450 on the PHY. The data and the control signal are then provided to the controller/processor 440. The controller/processor 440 performs functions of L2 layer, including interpreting information carried by the second signal and the first information and the third information in the present disclosure. The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first signaling; transmits a first signal; receives a second signaling; and transmits a second signal; herein, the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the first signaling is different from a transmitter of the second signaling.

In one embodiment, the first node 450 comprises a memory that stores a computer readable instruction program. The computer readable instruction program generates an action when executed by at least one processor. The action includes: receiving a first signaling; transmitting a first signal; receiving a second signaling; and transmitting a second signal; herein, the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the first signaling is different from a transmitter of the second signaling.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first signaling; and receives a second signal; herein, the first signaling is used to indicate time-frequency resources occupied by a first signal, the first signaling is used to indicate radio resources occupied by the second signal, and time-frequency resources occupied by the first signal are used to determine radio resources occupied by a second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the second signaling is a node other than the second node.

In one embodiment, the second node 410 comprises a memory that stores a computer readable instruction program. The computer readable instruction program generates an action when executed by at least one processor. The action includes: transmitting a first signaling; receiving a second signal; herein, the first signaling is used to indicate time-frequency resources occupied by a first signal, the first signaling is used to indicate radio resources occupied by the second signal, and time-frequency resources occupied by the first signal are used to determine radio resources occupied by a second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the second signaling is a node other than the second node.

In one embodiment, the first node 450 is a UE.

In one embodiment, the first node 450 is a UE that supports V2X.

In one embodiment, the first node 450 is a vehicle equipment.

In one embodiment, the first node 450 is an RSU device.

In one embodiment, the second node 410 is a base station (gNB/eNB).

In one embodiment, the second node 410 is a base station that supports V2X.

In one embodiment, the receiver 456 (including the antenna 460), the receiving processor 452 and the controller/processor 490 are used to receive the first signaling in the present disclosure.

In one embodiment, the transmitter 456 (including the antenna 460), the transmitting processor 455 and the controller/processor 490 are to transmit the second signal in the present disclosure.

In one embodiment, the transmitter 456 (including the antenna 460), the transmitting processor 455 and the controller/processor 490 are to transmit the first information in the present disclosure.

In one embodiment, the receiver 456 (including the antenna 460), the receiving processor 452 and the controller/processor 490 are used to receive the second information in the present disclosure.

In one embodiment, the transmitter 456 (including the antenna 460), the transmitting processor 455 and the controller/processor 490 are used to transmit the third information in the present disclosure.

In one embodiment, the transmitter 416 (including the antenna 420), the transmitting processor 415 and the controller/processor 440 are used to transmit the first signaling in the present disclosure.

In one embodiment, the receiver 416 (including the antenna 420), the receiving processor 412 and the controller/processor 440 are used to receive the second signal in the present disclosure.

In one embodiment, the receiver 416 (including the antenna 420), the receiving processor 412 and the controller/processor 440 are used to receive the first information in the present disclosure.

In one embodiment, the transmitter 416 (including the antenna 420), the transmitting processor 415 and the controller/processor 440 are used to transmit the second information in the present disclosure.

In one embodiment, the receiver 416 (including the antenna 420), the receiving processor 412 and the controller/processor 440 are used to receive the third information in the present disclosure.

Embodiment 5

Figure 5:
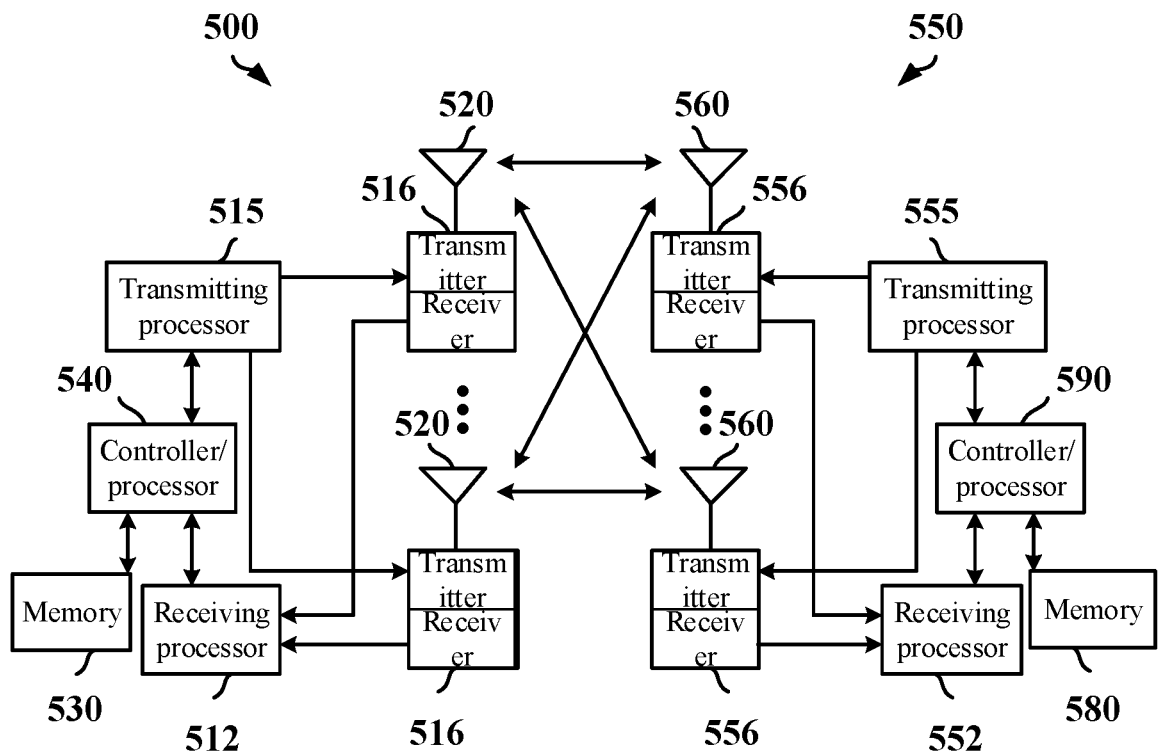
FIG. 5 illustrates a schematic diagram of a first node and another UE according to one embodiment of the present disclosure.

Embodiment 5 illustrates a schematic diagram of a first node and another UE according to the present disclosure, as shown in FIG. 5.

The first node (550) comprises a controller/processor 590, a memory 580, a receiving processor 552, a transmitter/receiver 556, and a transmitting processor 555, the transmitter/receiver 556 comprising an antenna 560. A higher layer packet is provided to the controller/processor 590 by the data source, the controller/processor 590 provides header compression, encryption, packet segmentation and reordering, and a multiplexing between a logical channel and a transport channel so as to implement the L2 layer protocols used for the user plane and the control plane; the higher layer packet may comprise data or control information, such as DL-SCH, UL-SCH or SL-SCH. The transmitting processor 555 performs various signal transmitting processing functions of the L1 layer (i.e., PHY), including coding, interleaving, scrambling, modulation, power control/allocation, precoding and physical layer control signaling generation. The receiving processor 552 performs various signal receiving processing functions of the L1 layer (i.e., PHY), including decoding, de-interleaving, descrambling, demodulation, de-precoding and physical layer control signaling extraction. The transmitter 556 is configured to convert a baseband signal provided by the transmitting processor 555 into an RF signal to be transmitted via the antenna 560, the receiver 556 is configured to convert the RF signal received via the antenna 560 into a baseband signal to be provided to the receiving processor 552. Composition in the another UE (500) is the same as that in the first node 550.

In sidelink transmission, a higher layer packet (comprising a first signal in the present disclosure) is provided to the controller/processor 590, which implements function of L2 layer. In sidelink transmission, the controller/processor 590 provides header compression, encryption, packet segmentation and reordering, and multiplexing between a logical channel and a transport channel. The controller/processor 590 is also responsible for HARQ operation (if it is supported), repeated transmission, and a signaling to the UE 500. The transmitting processor 555 implements various signal processing functions for L1 layer (that is, physical layer), comprising coding, interleaving, scrambling, modulation, power control/distribution, precoding and generation of physical layer control signaling, generation of the first signal in the present disclosure is completed at the transmitting processor 555. The modulated symbols are divided into parallel streams and each stream is mapped onto a corresponding multicarrier subcarrier and/or multicarrier symbol, which is later mapped from the transmitting processor 555 to the antenna 560 via the transmitter 556 to be transmitted in the form of RF signal. At the receiving side, each receiver 516 receives an RF signal via a corresponding antenna 520, each receiver 516 recovers baseband information modulated to the RF carrier and provides the baseband information to the receiving processor 512. The receiving processor 512 performs signal receiving processing functions of the L1 layer. The signal receiving and processing function includes receiving a first signal in the present disclosure, demodulating based on various modulation schemes (e.g., BPSK, and QPSK) via a multicarrier symbol in a multicarrier symbol stream, then descrambling, decoding and de-interleaving to recover a data or a control signal transmitted by the first communication node 550 on a physical channel, and providing the data and the control signal to the controller/processor 540. The controller/processor 540 implements the functionality of the L2 layer, and the controller/processor 540 interprets the first signal of the present disclosure. The controller/processor can be connected to a memory 530 that stores program code and data. The memory 530 may be called a computer readable medium. In particular, the second signaling in the present disclosure, is generated in the transmitting processor 515 in the UE 500, which is later mapped to the antenna 520 via the transmitter 516 to be transmitted in the form of RF signal. At the receiving end, each receiver 556 receives the RF signal of the second signaling through its corresponding antenna 560, each receiver 556 recovers the baseband information modulated on the RF carrier and provides the baseband information to the receiving processor 552, and the receiving processor 552 interprets the second signaling in the present disclosure.

In one embodiment, the transmitter 556 (including the antenna 560), the transmitting processor 555 and the controller/processor 590 are used to transmit the first signal in the present disclosure.

In one embodiment, the receiver 556 (including the antenna 560) and the receiving processor 552 are used to receive the second signaling in the present disclosure.

In one embodiment, the receiver 516 (including the antenna 520), the receiving processor 512 and the controller/processor 540 are used to receive the first signal in the present disclosure.

In one embodiment, the transmitter 516 (including the antenna 520), the transmitting processor 515 and the controller/processor 540 are used to transmit the second signaling in the present disclosure.

Embodiment 6

Figure 6:
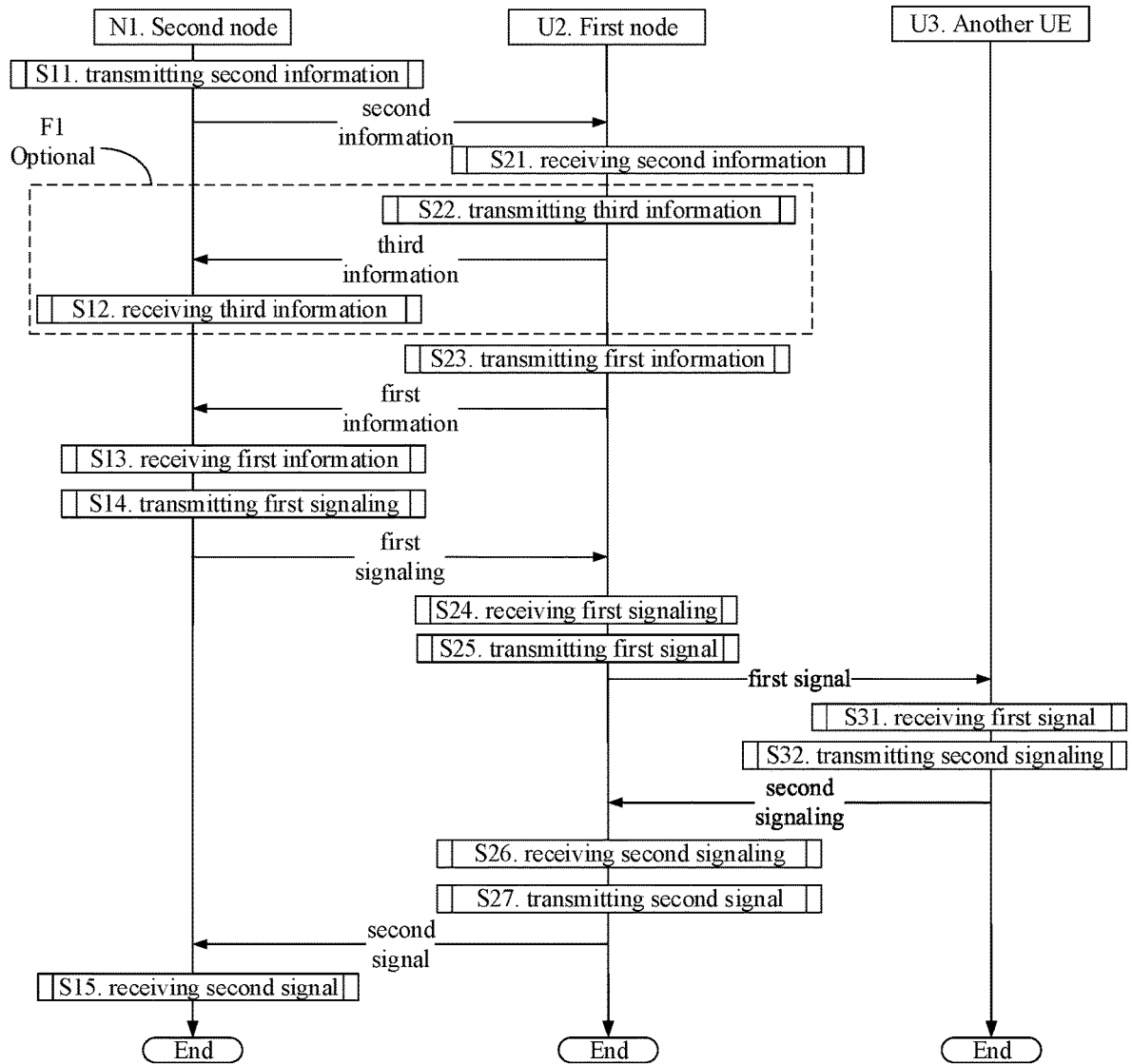
FIG. 6 illustrates a flowchart of transmission of a radio signal according to one embodiment of the present disclosure.

Embodiment 6 illustrates a flowchart of transmission of a radio signal according to one embodiment of the present disclosure, as shown in FIG. 6. In FIG. 6, a second node N1 is a maintenance base station of a serving cell of a first node U2, the first node U2 and another UE U3 are in communications via sidelink, and steps in dotted boxes are optional. It is particularly underlined that the order illustrated in the embodiment does not put constraints over sequences of signal transmissions and implementations.

The second node N1 transmits second information in step S11, receives third information in step S12, receives first information in step S13, transmits a first signaling in step S14, and receives a second signal in step S15.

The first node U2 receives second information in step S21, transmits third information in step S22, transmits first information in step S23, receives a first signaling in step S24, transmits a first signal in step S25, receives a second signaling in step S26, and transmits a second signal in step S27.

Another UE U3 receives a first signal in step S31 and transmits a second signaling in step S32.

In embodiment 6, the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the first signaling is different from a transmitter of the second signaling; the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first timing offset is used to determine the first information, and the reference link is one of the first link and the second link; the first information is transmitted via an air interface; the second information is used to determine a second timing offset, the second timing offset is used to determine a timing offset between a timing of a first link and a timing of the second link, and the first information is used to indicate a relation between the first timing offset and the second timing offset; the second information is transmitted via an air interface; the third information is used to indicate the reference delay, the reference delay is also related to an SCS of a subcarrier occupied by the second signaling in frequency domain, and the third information is transmitted via an air interface.

In one embodiment, the first information is higher-layer information.

In one embodiment, the first information is physical-layer information.

In one embodiment, the first information is semi-persistent information.

In one embodiment, the first information is transmitted by a higher-layer signaling.

In one embodiment, the first information is transmitted by a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IE) in a RRC signaling.

In one embodiment, the first information comprises all or partial fields in an IE in a RRC signaling.

In one embodiment, the first information comprises all or partial fields in a MAC layer signaling.

In one embodiment, the first information comprises all or part of a MAC Control Element (CE).

In one embodiment, the first information comprises all or part of a MAC Header.

In one embodiment, the first information is transmitted through a UL-SCH.

In one embodiment, the first information is transmitted through a Physical Uplink Shared Channel (PUSCH).

In one embodiment, the first information is UE-specific.

In one embodiment, the first information is carried through Msg3.

In one embodiment, the first information comprises partial or all information in UCI.

In one embodiment, the first information is transmitted through a Physical Uplink Control Channel.

In one embodiment, the first information is transmitted through the second link.

In one embodiment, the air interface is a radio interface.

In one embodiment, the air interface is a Uu interface.

In one embodiment, the radio interface is a radio interface between the first node in the present disclosure and the second node in the present disclosure.

In one embodiment, a target receiver of the first information is the second node in the present disclosure.

In one embodiment, the first node in the present disclosure expects that a receiver of the first information is the second node in the present disclosure.

In one embodiment, the above phrase of "the first timing offset being used to determine the first information" includes the following meaning: the first information comprises information related to the first timing offset.

In one embodiment, the above phrase of "the first timing offset being used to determine the first information" includes the following meaning: the first information is used to indicate the first timing offset.

In one embodiment, the above phrase of "the first timing offset being used to determine the first information" includes the following meaning: the first information is used to indicate information related to the first timing offset.

In one embodiment, the above phrase of "the first timing offset being used to determine the first information" includes the following meaning: the first timing offset is used by the first node in the present disclosure to determine the first information.

In one embodiment, the above phrase of "the first timing offset being used to determine the first information" includes the following meaning: the first timing offset is used to directly determine the first information.

In one embodiment, the above phrase of "the first timing offset being used to determine the first information" includes the following meaning: the first timing offset is used to indirectly determine the first information.

In one embodiment, the above phrase of "the first timing offset being used to determine the first information" includes the following meaning: the first timing offset is used to explicitly determine the first information.

In one embodiment, the above phrase of "the first timing offset being used to determine the first information" includes the following meaning: the first timing offset is used to implicitly determine the first information.

In one embodiment, the above phrase of "the first timing offset being used to determine the first information" includes the following meaning: the first information carries an operation result obtained by through an operation of the first timing offset.

In one embodiment, the second information is higher-layer information.

In one embodiment, the second information is transmitted by a higher-layer signaling.

In one embodiment, the second information is transmitted by a physical-layer signaling.

In one embodiment, the second information comprises all or part of a higher-layer signaling.

In one embodiment, the second information comprises all or part of a physical-layer signaling.

In one embodiment, the second information comprises all or partial IEs in a RRC signaling.

In one embodiment, the second information comprises all or partial fields in an IE in a RRC signaling.

In one embodiment, the second information comprises all or partial fields in a MAC layer signaling.

In one embodiment, the second information comprises all or part of a MAC CE.

In one embodiment, the second information comprises all or part of a MAC Header.

In one embodiment, the second information comprises all or part of a Random Access Response (RAR) MAC payload.

In one embodiment, the second information is a TA command.

In one embodiment, the second information is a TA update.

In one embodiment, the second information comprises all or part of Msg2 in random access procedure.

In one embodiment, the second information comprises all or part of MsgB in random access procedure.

In one embodiment, the second information is transmitted through a Downlink Shared Channel (DL-SCH).

In one embodiment, the second information is transmitted through a Physical Downlink Shared Channel (PDSCH).

In one embodiment, the second information is broadcast.

In one embodiment, the second information is unicast.

In one embodiment, the second information is Cell-Specific.

In one embodiment, the second information is UE-specific.

In one embodiment, the second information is UE group-specific.

In one embodiment, the second information is transmitted through a Physical Downlink Control Channel (PDCCH).

In one embodiment, the second information comprises all or partial fields of a DCI signaling.

In one embodiment, the above phrase of "the second information being used to determine a second timing offset" includes the following meaning: the second information is used by the first node in the present disclosure to determine the second timing offset.

In one embodiment, the above phrase of "the second information being used to determine a second timing offset" includes the following meaning: the second information is used to directly indicate the second timing offset.

In one embodiment, the above phrase of "the second information being used to determine a second timing offset" includes the following meaning: the second information is used to indirectly indicate the second timing offset.

In one embodiment, the above phrase of "the second information being used to determine a second timing offset" includes the following meaning: the second information is used to explicitly indicate the second timing offset.

In one embodiment, the above phrase of "the second information being used to determine a second timing offset" includes the following meaning: the second information is used to implicitly indicate the second timing offset.

In one embodiment, the third information is higher-layer information.

In one embodiment, the third information is physical-layer information.

In one embodiment, the third information is semi-persistent information.

In one embodiment, the third information is transmitted by a higher-layer signaling.

In one embodiment, the third information is transmitted by a physical-layer signaling.

In one embodiment, the third information comprises all or part of a higher-layer signaling.

In one embodiment, the third information comprises all or part of a physical-layer signaling.

In one embodiment, the third information comprises all or partial IEs in a RRC signaling.

In one embodiment, the third information comprises all or partial fields in an IE in a RRC signaling.

In one embodiment, the third information comprises all or partial fields in a MAC layer signaling.

In one embodiment, the third information comprises all or part of a MAC CE.

In one embodiment, the third information comprises all or part of a MAC Header.

In one embodiment, the third information is transmitted through a UL-SCH.

In one embodiment, the third information is transmitted through a PUSCH.

In one embodiment, the third information is UE-specific.

In one embodiment, the third information is carried by Msg3.

In one embodiment, the third information comprises partial or all information in UCI.

In one embodiment, the third information is transmitted through a Physical Uplink Control Channel.

In one embodiment, the third information is transmitted through the second link in the present disclosure.

In one embodiment, the third information carries a UE capability indication.

In one embodiment, the above phrase of "the third information being used to indicate the reference delay" includes the following meaning: the third information is used to directly indicate the reference delay.

In one embodiment, the above phrase of "the third information being used to indicate the reference delay" includes the following meaning: the third information is used to indirectly indicate the reference delay.

In one embodiment, the above phrase of "the third information being used to indicate the reference delay" includes the following meaning: the third information is used to explicitly indicate the reference delay.

In one embodiment, the above phrase of "the third information being used to indicate the reference delay" includes the following meaning: the third information is used to implicitly indicate the reference delay.

In one embodiment, the above phrase of "the third information being used to indicate the reference delay" includes the following meaning: the third information is used to indicate a capability of the first node in the present disclosure, and the capability of the first node in the present disclosure can be used for an indication of the reference delay.

In one embodiment, the above phrase of "the third information being used to indicate the reference delay" includes the following meaning: the third information is used to indicate a capability of the first node in the present disclosure, and the capability of the first node in the present disclosure can be used to determine the reference delay.

Embodiment 7

Embodiment 7 illustrates a schematic diagram of a first timing offset according to one embodiment of the present disclosure, as shown in FIG. 7. In FIG. 7, each rectangle represents a slot of a link to which it belongs, and a number in each rectangle represents an index of a slot in a frame of a link to which it belongs; in case A, a reference link is a first link; and in case B, a reference link is a second link.

In embodiment 7, the first signaling in the present disclosure is transmitted through a first link, the second signal in the present disclosure is transmitted through a second link, the first signal in the present disclosure is transmitted through a third link, and any two of the first link, the second link and the third link are different; a timing offset between a timing of the third link and a timing of a reference link is equal to a first timing offset, the first timing offset is used to determine the first information in the present disclosure, and the reference link is one of the first link and the second link; the first information is transmitted via an air interface.

In one embodiment, the first link is a Downlink (DL).

In one embodiment, the first link is a DL from the second node in the present disclosure to the first node in the present disclosure.

In one embodiment, the first link is a DL of a Uu interface.

In one embodiment, the above phrase of "the first signaling being transmitted through a first link" includes the following meaning: the first signaling is transmitted through a channel of the first link.

In one embodiment, the above phrase of "the first signaling being transmitted through a first link" includes the following meaning: the first signaling is transmitted through a downlink channel.

In one embodiment, the above phrase of "the first signaling being transmitted through a first link" includes the following meaning: the first signaling occupies DL time-frequency resources.

In one embodiment, the above phrase of "the first signaling being transmitted through a first link" includes the following meaning: frequency-domain resources occupied by the first signaling belong to a DL carrier.

In one embodiment, the above phrase of "the first signaling being transmitted through a first link" includes the following meaning: time-domain resources occupied by the first signaling belong to a DL slot.

In one embodiment, the above phrase of "the first signaling being transmitted through a first link" includes the following meaning: any OFDM symbol occupied by the first signaling belongs to a DL slot.

In one embodiment, the above phrase of "the first signaling being transmitted through a first link" includes the following meaning: any OFDM symbol occupied by the first signaling is a DL OFDM symbol.

In one embodiment, the above phrase of "the first signaling being transmitted through a first link" includes the following meaning: the first signaling carries DCI.

In one embodiment, the second link is an Uplink (UL).

In one embodiment, the second link is a UL from the first node in the present disclosure to the second node in the present disclosure.

In one embodiment, the second link is a UL of a Uu interface.

In one embodiment, the above phrase of "the second signal being transmitted through a second link" includes the following meaning: the second signal is transmitted through a channel of the second link.

In one embodiment, the above phrase of "the second signal being transmitted through a second link" includes the following meaning: the second signal is transmitted through a UL channel.

In one embodiment, the above phrase of "the second signal being transmitted through a second link" includes the following meaning: the second signal occupies UL time-frequency resources.

In one embodiment, the above phrase of "the second signal being transmitted through a second link" includes the following meaning: frequency-domain resources occupied by the second signal belong to a UL carrier.

In one embodiment, the above phrase of "the second signal being transmitted through a second link" includes the following meaning: time-domain resources occupied by the second signal belong to a UL slot.

In one embodiment, the above phrase of "the second signal being transmitted through a second link" includes the following meaning: any OFDM symbol occupied by the second signal in time domain belongs to a UL slot.

In one embodiment, the above phrase of "the second signal being transmitted through a second link" includes the following meaning: any OFDM symbol occupied by the second signal belongs to a UL OFDM symbol.

In one embodiment, the above phrase of "the second signal being transmitted through a second link" includes the following meaning: the second signal is transmitted through a UL-SCH.

In one embodiment, the third link is a Sidelink (SL).

In one embodiment, the third link is an SL between the first node in the present disclosure and another UE.

In one embodiment, the third link is an SL of a PC5 interface.

In one embodiment, the above phrase of "the first signal being transmitted through a third link" includes the following meaning: the first signal is transmitted through a channel of the third link.

In one embodiment, the above phrase of "the first signal being transmitted through a third link" includes the following meaning: the first signal is transmitted through a sidelink channel.

In one embodiment, the above phrase of "the first signal being transmitted through a third link" includes the following meaning: the first signal occupies SL time-frequency resources.

In one embodiment, the above phrase of "the first signal being transmitted through a third link" includes the following meaning: time-frequency resources occupied by the first signal belong to a sidelink time-frequency resource pool.

In one embodiment, the above phrase of "the first signal being transmitted through a third link" includes the following meaning: frequency-domain resources occupied by the first signal belong to an SL carrier.

In one embodiment, the above phrase of "the first signal being transmitted through a third link" includes the following meaning: frequency-domain resources occupied by the first signal belong to a dedicated carrier.

In one embodiment, the above phrase of "the first signal being transmitted through a third link" includes the following meaning: frequency-domain resources occupied by the first signal belong to an Intelligent Transportation System (ITS) spectrum.

In one embodiment, the above phrase of "the first signal being transmitted through a third link" includes the following meaning: frequency-domain resources occupied by the first signal belong to an SL frequency-domain resource pool in a UL carrier.

In one embodiment, the above phrase of "the first signal being transmitted through a third link" includes the following meaning: time-domain resources occupied by the first signal belong to an SL slot.

In one embodiment, the above phrase of "the first signal being transmitted through a third link" includes the following meaning: time-domain resources occupied by the first signal belong to an SL time-domain resource pool.

In one embodiment, the above phrase of "the first signal being transmitted through a third link" includes the following meaning: any OFDM symbol occupied by the first signal belongs to an SL slot.

In one embodiment, the above phrase of "the first signal being transmitted through a third link" includes the following meaning: any OFDM symbol occupied by the first signal is an SL OFDM symbol.

In one embodiment, the above phrase of "the first signal being transmitted through a third link" includes the following meaning: the first signal carries SCI.

In one embodiment, the above phrase of "the first signal being transmitted through a third link" includes the following meaning: the first signal is transmitted through a PSSCH.

In one embodiment, the above phrase of "the first signal being transmitted through a third link" includes the following meaning: the first signal is transmitted through a PSCCH.

In one embodiment, the above phrase of "the first signal being transmitted through a third link" includes the following meaning: the first signal is transmitted through a SL-SCH.

In one embodiment, the second signaling is transmitted through the third link.

In one embodiment, the second signaling is transmitted through sidelink assumed by the first node in the present disclosure.

In one embodiment, the second signaling is transmitted through sidelink assumed by a transmitter of the second signaling.

In one embodiment, the above phrase of "any two of the first link, the second link and the third link being different" includes the following meaning: link types of any two links among the first link, the second link and the third link are different.

In one embodiment, the above phrase of "any two of the first link, the second link and the third link being different" includes the following meaning: time-frequency resources occupied by any two links among the first link, the second link and the third link are different.

In one embodiment, the above phrase of "any two of the first link, the second link and the third link being different" includes the following meaning: time-frequency resources occupied by any two links among the first link, the second link and the third link are orthogonal.

In one embodiment, the above phrase of "any two of the first link, the second link and the third link being different" includes the following meaning: the first link is a DL, the second link is a UL, and the third link is an SL.

In one embodiment, a timing of the third link refers to a timing for receiving the third link.

In one embodiment, a timing of the third link refers to a timing for transmitting the third link.

In one embodiment, a timing of the third link refers to a timing of a frame of the third link.

In one embodiment, a timing of the third link refers to a timing for receiving a frame of the third link.

In one embodiment, a timing of the third link refers to a timing for transmitting a frame of the third link.

In one embodiment, a timing of the third link refers to for given numerology, a timing of a slot of the third link.

In one embodiment, a timing of the third link refers to for given numerology, a timing of an OFDM symbol of the third link.

In one embodiment, a timing of the third link refers to a position of a frame of the third link in time domain.

In one embodiment, a timing of the third link refers to a position of a frame of a given index of the third link in time domain.

In one embodiment, a timing of the third link refers to a position of a hyper-frame of a given index of the third link in time domain.

In one embodiment, a timing of the third link refers to a position of a half-frame of the third link in time domain.

In one embodiment, a timing of the reference link refers to a timing for transmitting the reference link.

In one embodiment, a timing of the reference link refers to a timing for receiving the reference link.

In one embodiment, a timing of the reference link refers to a timing for transmitting a frame of the reference link.

In one embodiment, a timing of the reference link refers to a timing for receiving a frame of the reference link.

In one embodiment, a timing of the reference link refers to a timing of a frame of the reference link.

In one embodiment, a timing of the reference link refers to for given numerology, a timing of a slot of the reference link.

In one embodiment, a timing of the reference link refers to for given numerology, a timing of an OFDM symbol of the reference link.

In one embodiment, a timing of the reference link refers to a position of a frame of the reference link in time domain.

In one embodiment, a timing of the reference link refers to a position of a hyper-frame of a given index of the reference link in time domain.

In one embodiment, a timing of the reference link refers to a position of a frame of a given index of the reference link in time domain.

In one embodiment, a timing of the reference link refers to a position of a half-frame of the reference link in time domain.

In one embodiment, the above phrase of "a timing offset between a timing of the third link and a timing of a reference link being equal to a first timing offset" includes the following meaning: a timing offset between timings of frames with a same index respectively belonging to the third link and the reference link is equal to the first timing offset.

In one embodiment, the above phrase of "a timing offset between a timing of the third link and a timing of a reference link being equal to a first timing offset" includes the following meaning: a timing offset between timings of hyper-frames with a same index respectively belonging to the third link and the reference link is equal to the first timing offset.

In one embodiment, the above phrase of "a timing offset between a timing of the third link and a timing of a reference link being equal to a first timing offset" includes the following meaning: a timing offset between a timing of a frame of the third link and a timing of a frame of the reference link is equal to the first timing offset.

In one embodiment, the above phrase of "a timing offset between a timing of the third link and a timing of a reference link being equal to a first timing offset" includes the following meaning: an offset in time domain between a start time of a frame of the third link and a start time of a frame of the reference link is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, the first frame and the second frame are non-orthogonal in time domain, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, an index of the first frame in the third link is equal to an index of the second frame in the reference link, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, the first frame and the second frame are partially overlapped in time domain, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, the first frame and the second frame are partially overlapped in time domain, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, the first frame and the second frame are partially overlapped in time domain, a start time of the first frame is not earlier than a start time of the second frame, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, the first frame and the second frame are partially overlapped in time domain, a start time of the first frame is not later than a start time of the second frame, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, time-domain resources occupied by the first signaling belong to the second frame, the first frame is an earliest frame of the third link satisfying that its start time is not earlier than the second frame, and a time-domain offset between a start time of the first frame and a start time of the second frame is equal to the first timing offset.

In one embodiment, the above phrase of "a timing offset between a timing of the third link and a timing of a reference link being equal to a first timing offset" includes the following meaning: a first frame is a frame of the third link, a second frame is a frame of the reference link, time-domain resources occupied by the first signaling belong to the second frame, the first frame is a latest frame of the third link satisfying that its start time is not later than the second frame, and a time-domain offset between a start time of the first frame and a start time of the second frame is equal to the first timing offset.

In one embodiment, the first timing offset is greater than 0.

In one embodiment, the first timing offset is less than 0.

In one embodiment, the first timing offset is equal to 0.

In one embodiment, the first timing offset is a rational number.

In one embodiment, the first timing offset is measured by s.

In one embodiment, the first timing offset is measured by ms.

In one embodiment, the first timing offset is equal to a time length of at least one OFDM symbol.

In one embodiment, the first timing offset is equal to a positive integral multiple of Tc, where Tc=1/(480000*4096) s.

In one embodiment, the first timing offset is represented by a number of OFDM symbols.

In one embodiment, the reference link is the first link or the reference link is the second link.

Embodiment 8

Embodiment 8 illustrates a schematic diagram of a second timing offset according to one embodiment of the present disclosure, as shown in FIG. 8. In FIG. 8, each rectangle represents a slot of a link to which it belongs, and a number in each rectangle represents an index of a slot in a frame of a link to which it belongs.

In embodiment 8, the second information in the present disclosure is used to determine a second timing offset, the second timing offset is used to determine a timing offset between a timing of the first link in the present disclosure and a timing of the second link in the present disclosure, and the first information is used to indicate a relation between the first timing offset and the second timing offset in the present disclosure.

In one embodiment, a timing of the first link refers to a timing for receiving the first link.

In one embodiment, a timing of the first link refers to a timing for transmitting the first link.

In one embodiment, a timing of the first link refers to a timing of a frame of the first link.

In one embodiment, a timing of the first link refers to a timing for receiving a frame of the first link.

In one embodiment, a timing of the first link refers to a timing for transmitting a frame of the first link.

In one embodiment, a timing of the first link refers to for given numerology, a timing of a slot of the first link.

In one embodiment, a timing of the first link refers to for given numerology, a timing of an OFDM symbol of the first link.

In one embodiment, a timing of the first link refers to a position of a frame of the first link in time domain.

In one embodiment, a timing of the first link refers to a position of a frame of a given index of the first link in time domain.

In one embodiment, a timing of the first link refers to a position of a hyper-frame of a given index of the first link in time domain.

In one embodiment, a timing of the first link refers to a position of a half-frame of the first link in time domain.

In one embodiment, a timing of the second link refers to a timing for receiving the second link.

In one embodiment, a timing of the second link refers to a timing for transmitting the second link.

In one embodiment, a timing of the second link refers to a timing of a frame of the second link.

In one embodiment, a timing of the second link refers to a timing for receiving a frame of the second link.

In one embodiment, a timing of the second link refers to a timing for transmitting a frame of the second link.

In one embodiment, a timing of the second link refers to for given numerology, a timing of a slot of the second link.

In one embodiment, a timing of the second link refers to for given numerology, a timing of an OFDM symbol of the second link.

In one embodiment, a timing of the second link refers to a position of a frame of the second link in time domain.

In one embodiment, a timing of the second link refers to a position of a frame of a given index of the second link in time domain.

In one embodiment, a timing of the second link refers to a position of a hyper-frame of a given index of the second link in time domain.

In one embodiment, a timing of the second link refers to a position of a half-frame of the second link in time domain.

In one embodiment, the second timing offset is equal to a Timing Advance (TA).

In one embodiment, the second timing offset is a TA of transmitting an uplink transmission of the first node in the present disclosure when transmitting the first signal.

In one embodiment, the second timing offset is used to determine a TA of a transmission timing of the second signal relative to a reception timing of the first signaling.

In one embodiment, the second timing offset is a TA of transmitting an uplink transmission of the first node in the present disclosure when transmitting the first signal, and the first node in the present disclosure assumes that a TA remains unchanged within a time interval between the first signal is transmitted and the second signal is transmitted.

In one embodiment, the first node in the present disclosure assumes that a TA remains unchanged within a range of satisfying a timing error within a time interval between the first signal is transmitted and the second signal is transmitted.

In one embodiment, the first node in the present disclosure assumes that a TA of an uplink transmission when the first signal is transmitted is equal to a TA of an uplink transmission when the second signal is transmitted.

In one embodiment, the first node in the present disclosure does not expect that a TA changes within a range of satisfying a timing error within a time interval between the first signal is transmitted and the second signal is transmitted.

In one embodiment, the first node in the present disclosure does not expect that a TA of an uplink transmission when the first signal is transmitted is not equal to a TA of an uplink transmission when the second signal is transmitted.

In one embodiment, the second timing offset belongs to higher layer information.

In one embodiment, the second timing offset belongs to all or part of MAC layer information.

In one embodiment, the second timing offset belongs to all or partial a field in a MAC header.

In one embodiment, the second timing offset belongs to all or partial a field in a MAC subheader.

In one embodiment, the second timing offset belongs to all or partial a field in a MAC CE.

In one embodiment, the second timing offset belongs to all or partial a field in a MAC Payload.

In one embodiment, the second timing offset is greater than 0.

In one embodiment, the second timing offset is less than 0.

In one embodiment, the second timing offset is equal to 0.

In one embodiment, the second timing offset is a non-negative real number.

In one embodiment, the second timing offset is measured by μs.

In one embodiment, the second timing offset is measured by s.

In one embodiment, the second timing offset is equal to a TA of a start time that the first node transmits a signal later than the first signal relative to a downlink slot boundary.

In one embodiment, the second timing offset is equal to at least one Tc, where Tc=1/(480000*4096) s.

In one embodiment, the second timing offset is equal to a transmission TA of the second signal.

In one embodiment, the second timing offset is equal to half of a TA.

In one embodiment, the second timing offset is equal to a sum of a first timing sub-offset and a second timing sub-offset, the first timing sub-offset is equal to a Round Trip Time (RTT) between the first node in the present disclosure and a transmitter of the first signaling, and the second timing sub-offset is configurable.

In one embodiment, the second timing offset is equal to a sum of a first timing sub-offset and a second timing sub-offset, the first timing sub-offset is equal to an RTT between the first node in the present disclosure and a transmitter of the first signaling, and the second timing sub-offset is related to a frequency range to which frequency-domain resources occupied by the second signal belong.

In one embodiment, the second timing offset is equal to a sum of a first timing sub-offset and a second timing sub-offset, the first timing sub-offset is equal to an RTT between the first node in the present disclosure and a transmitter of the first signaling, and the second timing sub-offset is related to a frequency range to which frequency-domain resources occupied by the second signal belong and an adopted duplex mode.

In one embodiment, the second timing offset is equal to a sum of a first timing sub-offset and a second timing sub-offset, the first timing sub-offset is equal to half of an RTT between the first node in the present disclosure and a transmitter of the first signaling, and the second timing sub-offset is related to a frequency range to which frequency-domain resources occupied by the second signal belong and an adopted duplex mode.

In one embodiment, the second timing offset is equal to an RTT between the first node in the present disclosure and a transmitter of the first signaling.

In one embodiment, the second timing offset is equal to half of an RTT between the first node in the present disclosure and a transmitter of the first signaling.

In one embodiment, the second timing offset is equal to a propagation delay between the first node in the present disclosure and a transmitter of the first signaling.

In one embodiment, the first TA is equal to $T_{TA}$ when the first node in the present disclosure transmitting the first signal.

In one embodiment, the first TA is equal to ½ $T_{TA}$ when the first node in the present disclosure transmitting the first signal.

In one embodiment, the first TA is equal to $(N_{TA}+N_{TA,offset})T_c$ when the first node in the present disclosure transmitting the first signal.

In one embodiment, the first TA is equal to ½ $(N_{TA}+N_{TA,offset})T_c$ when the first node in the present disclosure transmitting the first signal.

In one embodiment, the first TA is equal to $N_{TA}T_c$ when the first node in the present disclosure transmitting the first signal.

In one embodiment, the first TA is equal to ½$N_{TA}T_c$ when the first node in the present disclosure transmitting the first signal.

In one embodiment, the above phrase of "the second timing offset being used to determine a timing offset between a timing of the first link and a timing of the second link" includes the following meaning: the second timing offset is equal to a timing offset between a timing of the first link and a timing of the second link.

In one embodiment, the above phrase of "the second timing offset being used to determine a timing offset between a timing of the first link and a timing of the second link" includes the following meaning: the second timing offset is equal to half of a timing offset between a timing of the first link and a timing of the second link.

In one embodiment, the above phrase of "the second timing offset being used to determine a timing offset between a timing of the first link and a timing of the second link" includes the following meaning: the second timing offset is equal to 2 times of a timing offset between a timing of the first link and a timing of the second link.

In one embodiment, the above phrase of "the second timing offset being used to determine a timing offset between a timing of the first link and a timing of the second link" includes the following meaning: the second timing offset belongs to a partial a timing offset between a timing of the first link and a timing of the second link.

In one embodiment, the above phrase of "the second timing offset being used to determine a timing offset between a timing of the first link and a timing of the second link" includes the following meaning: the second timing offset is used to calculate a timing offset between a timing of the first link and a timing of the second link.

In one embodiment, the above phrase of "the second timing offset being used to determine a timing offset between a timing of the first link and a timing of the second link" includes the following meaning: the second timing offset is used to determine a TA of a start time for transmitting a first frame of the second link relative to a start time for receiving a frame of the first link corresponding to the first frame, and the first frame is a frame of the second link when the first signal is transmitted by the first node in the present disclosure.

In one embodiment, the above phrase of "the second timing offset being used to determine a timing offset between a timing of the first link and a timing of the second link" includes the following meaning: the second timing offset is used to determine a TA of a start time for transmitting a first frame of the second link relative to a start time for receiving a frame of the first link corresponding to the first frame, and the first frame is a frame of the second link.

In one embodiment, the above phrase of "the second timing offset being used to determine a timing offset between a timing of the first link and a timing of the second link" includes the following meaning: the second timing offset is used to determine a TA of a transmission timing of the second link relative to a reception timing of the first link.

In one embodiment, the above phrase of "the second timing offset being used to determine a timing offset between a timing of the first link and a timing of the second link" includes the following meaning: the second timing offset is used to determine an uplink TA of the first node in the present disclosure.

In one embodiment, the above phrase of "the second timing offset being used to determine a timing offset between a timing of the first link and a timing of the second link" includes the following meaning: the second timing offset is used to determine a timing difference between a frame of the second link and a frame of the first link with a same frame index.

In one embodiment, the above phrase of "the second timing offset being used to determine a timing offset between a timing of the first link and a timing of the second link" includes the following meaning: the second timing offset is used to determine a boundary distance in time domain between a frame of the second link and a frame of the first link with a same frame index.

In one embodiment, the above phrase of "the first information being used to indicate a relation between the first timing offset and the second timing offset" includes: the first information is used by the first node in the present disclosure to indicate a relation between the first timing offset and the second timing offset.

In one embodiment, the above phrase of "the first information being used to indicate a relation between the first timing offset and the second timing offset" includes: the first information is used to directly indicate a relation between the first timing offset and the second timing offset.

In one embodiment, the above phrase of "the first information being used to indicate a relation between the first timing offset and the second timing offset" includes: the first information is used to indirectly indicate a relation between the first timing offset and the second timing offset.

In one embodiment, the above phrase of "the first information being used to indicate a relation between the first timing offset and the second timing offset" includes: the first information is used to explicitly indicate a relation between the first timing offset and the second timing offset.

In one embodiment, the above phrase of "the first information being used to indicate a relation between the first timing offset and the second timing offset" includes: the first information is used to implicitly indicate a relation between the first timing offset and the second timing offset.

In one embodiment, the phrase in the present disclosure of "the first timing offset being used to determine the first information" refers to: the first information is used to indicate a relation between the first timing offset and the second timing offset.

In one embodiment, "a relation between the first timing offset and the second timing offset" refers to: a magnitude relation between the first timing offset and the second timing offset.

In one embodiment, "a relation between the first timing offset and the second timing offset" refers to: a mapping relation between the first timing offset and the second timing offset.

In one embodiment, "a relation between the first timing offset and the second timing offset" refers to: a functional relation between the first timing offset and the second timing offset.

In one embodiment, "a relation between the first timing offset and the second timing offset" refers to: a magnitude relation between the first timing offset and half of the second timing offset.

In one embodiment, "a relation between the first timing offset and the second timing offset" refers to: a difference value between the first timing offset and half of the second timing offset.

In one embodiment, "a relation between the first timing offset and the second timing offset" refers to: a magnitude relation between 2 times of the first timing offset and the second timing offset.

In one embodiment, "a relation between the first timing offset and the second timing offset" refers to: a magnitude relation between the first timing offset and 2 times the second timing offset.

In one embodiment, "a relation between the first timing offset and the second timing offset" refers to: a difference value between the first timing offset and 2 times of the second timing offset.

In one embodiment, "a relation between the first timing offset and the second timing offset" refers to: a difference value between the first timing offset and the second timing offset.

Embodiment 9

Embodiment 9 illustrates a schematic diagram of a relation between a first length and a first timing offset according to one embodiment of the present disclosure, as shown in FIG. 9. In FIG. 9, each rectangle represents a slot of a link to which it belongs, and a number in each rectangle represents an index of a slot in a frame of a link to which it belongs; in case A and case B, reference links are different.

In embodiment 9, for an SCS of a subcarrier occupied by the second signal in the present disclosure in frequency domain, a time length of a slot of the second link in the present disclosure is equal to a first length; the first information in the present disclosure is used to indicate an integer ratio between the first timing offset in the present disclosure and the first length.

In one embodiment, an SCS of a subcarrier occupied by the second signal in frequency domain is equal to one of 15 kHz, 30 kHz, 60 kHz, 120 kHz and 240 kHz.

In one embodiment, SCSs of all subcarriers occupied by the second signal in frequency are equal.

In one embodiment, the first length and an SCS of a subcarrier occupied by the second signal in frequency domain are in an inversely proportional relation.

In one embodiment, for an SCS of a subcarrier occupied by the second signal in frequency domain, a time length of any slot of the second link is equal to the first length.

In one embodiment, the first length is greater than 0.

In one embodiment, the first length is measured by s.

In one embodiment, the first length is measured by ms.

In one embodiment, the first length is represented by a number of OFDM symbols.

In one embodiment, the first length is represented by a number of Tc(s), where Tc=1/(480000*4096) s.

In one embodiment, the above phrase of "the first information being used to indicate an integer ratio of the first timing offset and the first length" includes the following meaning: when the first timing offset can be exactly divided by the first length, the first information is used to indicate a quotient between the first timing offset and the first length; when the first timing offset cannot be exactly divided by the first length, the first information is used to indicate a value of a quotient between the first timing offset and the first length rounded up to an integer.

In one embodiment, the above phrase of "the first information being used to indicate an integer ratio of the first timing offset and the first length" includes the following meaning: when the first timing offset can be exactly divided by the first length, the first information is used to indicate a quotient between the first timing offset and the first length; when the first timing offset cannot be exactly divided by the first length, the first information is used to indicate a value of a quotient between the first timing offset and the first length rounded down to an integer.

In one embodiment, the above phrase of "the first information being used to indicate an integer ratio of the first timing offset and the first length" includes the following meaning: the first information is used to directly indicate an integer ratio between the first timing offset and the first length.

In one embodiment, the above phrase of "the first information being used to indicate an integer ratio of the first timing offset and the first length" includes the following meaning: the first information is used to indirectly indicate an integer ratio between the first timing offset and the first length.

In one embodiment, the above phrase of "the first information being used to indicate an integer ratio of the first timing offset and the first length" includes the following meaning: the first information is used to explicitly indicate an integer ratio between the first timing offset and the first length.

In one embodiment, the above phrase of "the first information being used to indicate an integer ratio of the first timing offset and the first length" includes the following meaning: the first information is used to implicitly indicate an integer ratio between the first timing offset and the first length.

Embodiment 10

Embodiment 10 illustrates a schematic diagram of a reference delay according to one embodiment of the present disclosure, as shown in FIG. 10. In FIG. 10, the first column on the left represents an SCS of a subcarrier occupied by a second signal in frequency domain, the second column on the left represents an SCS of a subcarrier occupied by the second signaling in frequency domain, and the second column on the left represents a reference delay.

In embodiment 10, the third information in the present disclosure is used to indicate the reference delay in the present disclosure, the reference delay is also related to an SCS of a subcarrier occupied by the second signaling in the present disclosure in frequency domain, and the third information is transmitted via an air interface.

In one embodiment, the above phrase of "the reference delay is also related to an SCS of a subcarrier occupied by the second signaling in frequency domain" includes the following meaning: an SCS of a subcarrier occupied by the second signal in the present disclosure in frequency domain is equal to a first spacing, an SCS of a subcarrier occupied by the second signaling is equal to a second spacing, and the reference delay is related to a smaller one between the first spacing and the second spacing.

In one embodiment, the above phrase of "the reference delay is also related to an SCS of a subcarrier occupied by the second signaling in frequency domain" includes the following meaning: the reference delay is related to an index of an SCS of a subcarrier occupied by the second signaling in frequency domain.

In one embodiment, the above phrase of "the reference delay is also related to an SCS of a subcarrier occupied by the second signaling in frequency domain" includes the following meaning: an index of an SCS of a subcarrier occupied by the second signaling in frequency domain is used to determine the reference delay.

In one embodiment, the above phrase of "the reference delay is also related to an SCS of a subcarrier occupied by the second signaling in frequency domain" includes the following meaning: an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a smaller one between the first index and the second index.

In one embodiment, the above phrase of "the reference delay is also related to an SCS of a subcarrier occupied by the second signaling in frequency domain" includes the following meaning: an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a greater one between the first index and the second index.

In one embodiment, the above phrase of "the reference delay is also related to an SCS of a subcarrier occupied by the second signaling in frequency domain" includes the following meaning: an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and a smaller one between the first index and the second index is used to determine the reference delay.

In one embodiment, the above phrase of "the reference delay being also related to an SCS of a subcarrier occupied by the second signaling in frequency domain" is implemented through the following formula:

$$D_{reference} = N_5 \cdot (2048 + 144) \cdot \kappa \cdot 2^{-\rho} \cdot T_C$$

Herein, $D_{reference}$ represents the reference delay, ρ represents an index of an SCS of a subcarrier occupied by the second signaling in frequency domain, $T_c$=1/(480000*4096) s, κ=64, and $N_5$ is a value related to ρ.

In one embodiment, the above phrase of "the reference delay being also related to an SCS of a subcarrier occupied by the second signaling in frequency domain" is implemented through the following formula:

$$D_{reference} = N_4 \cdot (2048 + 144) \cdot \kappa \cdot 2^{-\mu} \cdot T_C$$

herein, an SCS of a subcarrier occupied by the second signal in frequency domain is a first index, and an index of an SCS of a subcarrier occupied by the second signaling in frequency domain is a second index, the first index is a non-negative integer, and the second index is a non-negative integer; $D_{reference}$ represents the reference delay, μ represents a smaller one between the first index and the second index, $T_c=1/(480000*4096)$s, κ=64, and $N_4$ is a value related to μ.

In one embodiment, the above phrase of "the reference delay being also related to an SCS of a subcarrier occupied by the second signaling in frequency domain" is implemented through the following formula:

$$D_{reference} = N_4 \cdot (2048 + 144) \cdot \kappa \cdot 2^{-\mu} \cdot T_C$$

herein, an SCS of a subcarrier occupied by the second signal in frequency domain is a first index, and an index of an SCS of a subcarrier occupied by the second signaling in frequency domain is a second index, the first index is a non-negative integer, the second index is a non-negative integer; $D_{reference}$ represents the reference delay, μ represents a greater $D_{reference}$ index one between the first index and the second index, $T_c=1/(480000*4096)$s, κ=64, and $N_4$ is a value related to μ.

Embodiment 11

Embodiment 11 illustrates a schematic diagram of aa first slot according to one embodiment of the present disclosure, as shown in FIG. 11. In FIG. 11, each rectangle in the upper row represents a slot of a link transmitting a first signaling for an SCS of a subcarrier occupied by a first signaling in frequency domain, and each rectangle in the lower row represents a slot of a link transmitting a first signal for an SCS of a subcarrier occupied by a first signal in frequency domain, each slash-filled rectangle represents a slot occupied by a first signaling in time domain, and each cross-line filled rectangle represents a slot occupied by a first signal in time domain.

In embodiment 11, the first signaling in the present disclosure is used to determine a second delay, a first slot is an earliest slot comprising time-domain resources occupied by the first signal in the present disclosure, and a start time of the first slot is not earlier than an end time for receiving the first signaling; for an SCS of a subcarrier occupied by the first signal in frequency domain, the first slot is an earliest slot satisfying that a length of a time interval between the start time of the first slot and the end time for receiving the first signaling is not less than the second delay.

In one embodiment, the above phrase of "the first signaling being used to a second delay" includes the following meaning: the first signaling is used by the first node in the present disclosure to determine the second delay.

In one embodiment, the above phrase of "the first signaling being used to a second delay" includes the following meaning: the first signaling is used to directly indicate the second delay.

In one embodiment, the above phrase of "the first signaling being used to a second delay" includes the following meaning: the first signaling is used to indirectly indicate the second delay.

In one embodiment, the above phrase of "the first signaling being used to a second delay" includes the following meaning: the first signaling is used to explicitly indicate the second delay.

In one embodiment, the above phrase of "the first signaling being used to a second delay" includes the following meaning: the first signaling is used to implicitly indicate the second delay.

In one embodiment, the above phrase of "the first signaling being used to a second delay" includes the following meaning: the first signaling is used to indicate a target delay, and the second timing offset and the target delay in the present disclosure are used together to determine the second delay.

In one embodiment, the above phrase of "the first signaling being used to a second delay" includes the following meaning: the first signaling is used to indicate a target delay, and the second delay and the target delay are linearly related.

In one embodiment, the above phrase of "the first signaling being used to a second delay" includes the following meaning: the first signaling is used to indicate a target delay, and half of the second timing offset in the present disclosure and the target delay are used together to determine the second delay.

In one embodiment, the above phrase of "the first signaling being used to a second delay" includes the following meaning: the first signaling is used to indicate a target delay, and a difference value of the target delay minus the second timing offset in the present disclosure is equal to the second delay.

In one embodiment, the above phrase of "the first signaling being used to a second delay" includes the following meaning: the first signaling is used to indicate a target delay, and a difference value of the target delay and half of the second timing offset in the present disclosure is equal to the second delay.

In one embodiment, the second timing offset in the present disclosure is also used to determine the second delay.

In one embodiment, the above phrase of "a first slot being an earliest slot comprising time-domain resources occupied by the first signal" includes the following meaning: a start time of the first slot is equal to a start time for transmitting the first signal.

In one embodiment, the above phrase of "a first slot being an earliest slot comprising time-domain resources occupied by the first signal" includes the following meaning: an earliest OFDM symbol occupied by the first signal in time domain belongs to the first slot.

In one embodiment, the above phrase of "a first slot being an earliest slot comprising time-domain resources occupied by the first signal" includes the following meaning: the first slot is an earliest slot comprising partial time-domain resources occupied by the first signal.

In one embodiment, the above phrase of "a first slot being an earliest slot comprising time-domain resources occupied by the first signal" includes the following meaning: the first slot is an earliest slot comprising all time-domain resources occupied by the first signal.

In one embodiment, the above phrase of "a first slot being an earliest slot comprising time-domain resources occupied by the first signal" includes the following meaning: each of X slots comprises partial time-domain resources occupied by the first signal, and the first slot is an earliest slot among the X slots, X being a positive integer greater than 1.

In one embodiment, the second delay is equal to a time length of a non-negative integer number of slot(s).

In one embodiment, the second delay is equal to a time length of a positive integer number of slot(s).

In one embodiment, the second delay is greater than 0.

In one embodiment, the second delay is greater than or equal to 0.

In one embodiment, the second delay is equal to a time length of a non-negative integer number of sidelink slot(s).

In one embodiment, the second delay is equal to a time length of a positive integer number of sidelink slot(s).

In one embodiment, the second delay is equal to a time length of a non-negative integer number of downlink slot(s).

In one embodiment, the second delay is equal to a time length of a positive integer number of downlink slot(s).

In one embodiment, the second delay is equal to a time length of a non-negative integer number of uplink slot(s).

In one embodiment, the second delay is equal to a time length of positive integer number of uplink slot(s).

In one embodiment, for an SCS of a subcarrier comprised in frequency-domain resources occupied by the first signal, the second delay is equal to a time length of a non-negative integer number of slot(s).

In one embodiment, for an SCS of a subcarrier comprised in frequency-domain resources occupied by the first signal, the second delay is equal to a time length of a positive integer number of slot(s).

In one embodiment, the second delay is equal to a time length of a positive integer number of OFDM symbol(s).

In one embodiment, the second delay is equal to a time length of at least one Tc, where Tc=1/(480000*4096) s.

In one embodiment, the first slot is a sidelink slot.

In one embodiment, the first slot is a slot of the third link in the present disclosure.

In one embodiment, the first slot is a slot corresponding to an SCS of a subcarrier comprised in frequency-domain resources occupied by the first signal.

In one embodiment, a start time of the first slot is later than an end time for receiving the first signaling.

In one embodiment, a start time of the first slot is equal to an end time for receiving the first signaling.

In one embodiment, the above phrase of "a length of a time interval between a start time of the first slot and an end time for receiving the first signaling being not less than an earliest slot of the second delay" includes the following meaning: in a carrier to which frequency-domain resources occupied by the second signal belong in frequency domain, the first slot belongs to a first slot set, the first slot set comprises at least one slot, a length of a time interval between a start time of any slot in the first slot set and an end time for receiving the first signaling is not less than the second delay, and the first slot is a slot with an earliest start time in the first slot set.

In one embodiment, the above phrase of "a length of a time interval between a start time of the first slot and an end time for receiving the first signaling being not less than an earliest slot of the second delay" includes the following meaning: in a carrier to which frequency-domain resources occupied by the first signal belong, there does not exist a length of a time interval between a start time of a slot earlier than the first slot and an end time for receiving the first signaling being not less than the second delay.

Embodiment 12

Embodiment 12 illustrates a schematic diagram of a second slot according to one embodiment of the present disclosure, as shown in FIG. 12. In FIG. 12, in each case, each rectangle in the upper row represents a slot of a link transmitting a first signaling for an SCS of a subcarrier occupied by a first signaling in frequency domain, each rectangle in the middle row represents a slot of a link transmitting a first signal for an SCS of a subcarrier occupied by a second signal in frequency domain; and each rectangle in the bottom row represents a slot of a link transmitting a first signal for an SCS of a subcarrier occupied by a first signal in frequency domain; in case A, a reference time is an end time for receiving a first signaling; in case B, a reference time is an end time for transmitting a first signal; in case C, a reference time is an end time for receiving a second signaling.

In embodiment 12, the first signaling in the present disclosure is used to determine a third delay, a second slot is an earliest slot comprising time-domain resources occupied by the second signal in the present disclosure, for an SCS of a subcarrier occupied by the second signal in frequency domain, the second slot is an earliest slot satisfying that a length of a time interval between its start time and a reference time is not less than the third delay; the reference time is one of an end time for receiving the first signaling in the present disclosure, an end time for transmitting the first signal in the present disclosure and an end time for receiving the second signaling in the present disclosure.

In one embodiment, the above phrase of "the first signaling being used to a third delay" includes the following meaning: the first signaling is used by the first node in the present disclosure to determine the third delay.

In one embodiment, the above phrase of "the first signaling being used to a third delay" includes the following meaning: the first signaling is used to directly indicate the third delay.

In one embodiment, the above phrase of "the first signaling being used to a third delay" includes the following meaning: the first signaling is used to indirectly indicate the third delay.

In one embodiment, the above phrase of "the first signaling being used to a third delay" includes the following meaning: the first signaling is used to explicitly indicate the third delay.

In one embodiment, the above phrase of "the first signaling being used to a third delay" includes the following meaning: the first signaling is used to implicitly indicate the third delay.

In one embodiment, the above phrase of "a second slot being an earliest slot comprising time-domain resources occupied by the second signal" includes the following meaning: a start time of the second slot is equal to a start time for transmitting the second signal.

In one embodiment, the above phrase of "a second slot being an earliest slot comprising time-domain resources occupied by the second signal" includes the following meaning: an earliest OFDM symbol occupied by the second signal in time domain belongs to the second slot.

In one embodiment, the above phrase of "a second slot being an earliest slot comprising time-domain resources occupied by the second signal" includes the following meaning: the second slot is an earliest slot comprising partial time-domain resources occupied by the second signal.

In one embodiment, the above phrase of "a second slot being an earliest slot comprising time-domain resources occupied by the second signal" includes the following meaning: the second slot is an earliest slot comprising all time-domain resources occupied by the second signal.

In one embodiment, the above phrase of "a second slot being an earliest slot comprising time-domain resources occupied by the second signal" includes the following meaning: each of Y slots comprises partial time-domain resources occupied by the second signal, and the second slot is an earliest one of the Y slots, Y being a positive integer greater than 1.

In one embodiment, the third delay is equal to a time length of a non-negative integer number of slot(s).

In one embodiment, the third delay is equal to a time length of a positive integer number of slot(s).

In one embodiment, the third delay is greater than 0.

In one embodiment, the third delay is equal to a time length of a non-negative integer number of sidelink slot(s).

In one embodiment, the third delay is equal to a time length of a positive integer number of sidelink slot(s).

In one embodiment, the third delay is equal to a time length of a non-negative integer number of downlink slot(s).

In one embodiment, the third delay is equal to a time length of positive integer number of downlink slot(s).

In one embodiment, the third delay is equal to a time length of a non-negative integer number of uplink slot(s).

In one embodiment, the third delay is equal to a time length of a positive integer number of uplink slot(s).

In one embodiment, the third delay is equal to a time length of a non-negative integer number of slot(s) of the third link in the present disclosure.

In one embodiment, the third delay is equal to a time length of a positive integer number of slot(s) of the third link in the present disclosure.

In one embodiment, the third delay is equal to a time length of a non-negative integer number of slot(s) of the first link in the present disclosure.

In one embodiment, the third delay is equal to a time length of a positive integer number of slot(s) of the first link in the present disclosure.

In one embodiment, the third delay is equal to a time length of a non-negative integer number of slot(s) of the second link in the present disclosure.

In one embodiment, the third delay is equal to a time length of a positive integer number of slot(s) of the second link in the present disclosure.

In one embodiment, for an SCS of a subcarrier comprised in frequency-domain resources occupied by the second signal, the third delay is equal to a time length of a non-negative integer number of slot(s).

In one embodiment, for an SCS of a subcarrier comprised in frequency-domain resources occupied by the second signal, the third delay is equal to a time length of a positive integer number of slot(s).

In one embodiment, for an SCS of a subcarrier comprised in frequency-domain resources occupied by the first signal, the third delay is equal to a time length of a non-negative integer number of slot(s).

In one embodiment, for an SCS of a subcarrier comprised in frequency-domain resources occupied by the first signal, the third delay is equal to a time length of a positive integer number of slot(s).

In one embodiment, the third delay is equal to a time length of a positive integer number of OFDM symbol(s).

In one embodiment, the third delay is equal to a time length of at least one Tc, where Tc=1/(480000*4096) s.

In one embodiment, the third delay is equal to a slot of a numerology adopted by at least one the first signal.

In one embodiment, the second slot is an uplink slot.

In one embodiment, the second slot is a slot corresponding to an SCS of a subcarrier comprised in frequency-domain resources occupied by the second signal.

In one embodiment, time lengths of the second slot and the first slot in the present disclosure are not equal.

In one embodiment, time lengths of the second slot and the first slot in the present disclosure are equal.

In one embodiment, a start time of the second slot is later than the reference time.

In one embodiment, a start time of the second slot is equal to the reference time.

In one embodiment, the above phrase of "the second slot being an earliest slot satisfying that a length of a time interval between its start time and the reference time being not less than the third delay" includes the following meaning: in a carrier to which frequency-domain resources occupied by the second signal belong in frequency domain, the second slot belongs to a second slot set, the second slot set comprises at least one slot, a length of a time interval between a start time of any slot in the second slot set and the reference time is not less than the third delay, and the second slot is a slot with an earliest start time in the second slot set.

In one embodiment, the above phrase of "the second slot being an earliest slot satisfying that a length of a time interval between its start time and the reference time being not less than the third delay" includes the following meaning: in a carrier to which frequency-domain resources occupied by the second signal belong in frequency domain, there does not exist a length of a time interval between a start time of a slot of the second slot and the reference time being not less than the third delay.

In one embodiment, the above phrase of "the reference time is one of an end time for receiving the first signaling, an end time for transmitting the first signal or an end time for receiving the second signaling" includes the following meaning: the reference time is an end time for receiving the first signaling.

In one embodiment, the above phrase of "the reference time is one of an end time for receiving the first signaling, an end time for transmitting the first signal or an end time for receiving the second signaling" includes the following meaning: the reference time is an end time for transmitting the first signal.

In one embodiment, the above phrase of "the reference time is one of an end time for receiving the first signaling, an end time for transmitting the first signal or an end time for receiving the second signaling" includes the following meaning: the reference time is an end time for receiving the second signaling.

In one embodiment, an end time for receiving the first signaling is an end time for receiving a slot to which time-domain resources occupied by the second signaling belong.

In one embodiment, an end time for receiving the first signaling is an end time for receiving a latest OFDM symbol in OFDM symbols occupied by the second signaling in time domain.

In one embodiment, an end time for receiving the first signaling is an end time for receiving a slot to which a latest OFDM symbol in OFDM symbols occupied by the second signaling in time domain belongs.

In one embodiment, an end time for transmitting the first signal is an end time of a latest OFDM symbol in OFDM symbols occupied by the first signal in time domain.

In one embodiment, an end time for transmitting the first signal is an end time of a slot to which a latest OFDM symbol in OFDM symbols occupied by the first signal in time domain belongs.

In one embodiment, an end time for receiving the second signaling is an end time for receiving a slot to which time-domain resources occupied by the second signaling belong.

In one embodiment, an end time for receiving the second signaling is an end time for receiving a latest OFDM symbol in OFDM symbols occupied by the second signaling in time domain.

In one embodiment, an end time for receiving the second signaling is an end time for receiving a slot to which a latest OFDM symbol in OFDM symbols occupied by the second signaling in time domain belongs.

Embodiment 13

Figure 13:
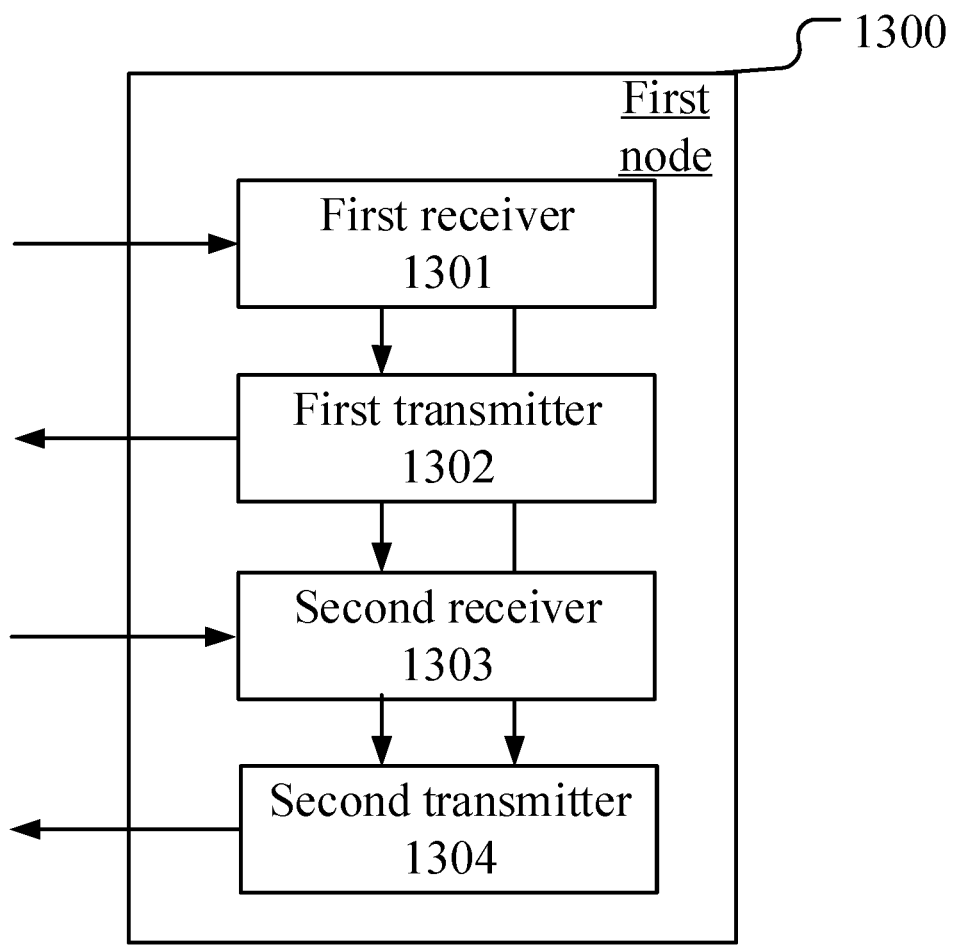
FIG. 13 illustrates a structure block diagram of a processing device in a first node according to one embodiment of the present disclosure.

Embodiment 13 illustrates the structure diagram of a processing device in a first node, as shown in FIG. 13. In FIG. 13, a processing device 1300 of a first node comprises a first receiver 1301, a first transmitter 1302, a second receiver 1303 and a second transmitter 1304. The first receiver 1301 comprises the transmitter/receiver 456 (including the antenna 460), the receiving processor 452 and the controller/processor 490 in FIG. 4 of the present disclosure; or the first receiver 1301 comprises the transmitter/receiver 556 (including the antenna 560), the receiving processor 552 and the controller/processor 590 in FIG. 5 of the present disclosure; the first transmitter 1302 comprises the transmitter/receiver 456 (including the antenna 460), the transmitting processor 455 and the controller/processor 490 in FIG. 4 of the present disclosure; or the first transmitter 1302 comprises the transmitter/receiver 556 (including the antenna 560), the transmitting processor 555 and the controller/processor 590 in FIG. 5 of the present disclosure; the second receiver 1303 comprises the transmitter/receiver 456 (including the antenna 460) and the receiving processor 452 in FIG. 4 in the present disclosure; or the second receiver 1303 comprises the transmitter/receiver 556 (including the antenna 560) and the receiving processor 552 in FIG. 5 in the present disclosure; the second transmitter 1304 comprises the transmitter/receiver 456 (including the antenna 460), the transmitting processor 455 and the controller/processor 490 in FIG. 4 of the present disclosure; or the second transmitter 1304 comprises the transmitter/receiver 556 (including the antenna 560), the transmitting processor 555 and the controller/processor 590 in FIG. 5 of the present disclosure;

in embodiment 13, the first receiver 1301 receives a first signaling; the first transmitter 1302 transmits a first signal; the second receiver 1303 receives a second signaling; the second transmitter 1304 transmits a second signal; the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the first signaling is different from a transmitter of the second signaling.

In one embodiment, the second transmitter 1304 transmits first information; herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first timing offset is used to determine the first information, and the reference link is one of the first link and the second link; the first information is transmitted via an air interface.

In one embodiment, the second transmitter 1304 transmits first information; herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first timing offset is used to determine the first information, and the reference link is one of the first link and the second link; the first information is transmitted via an air interface; the first receiver 1301 receives second information; the second information is used to determine a second timing offset, the second timing offset is used to determine a timing offset between a timing of a first link and a timing of the second link, and the first information is used to indicate a relation between the first timing offset and the second timing offset; the second information is transmitted via an air interface.

In one embodiment, the second transmitter 1304 transmits first information; herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first timing offset is used to determine the first information, and the reference link is one of the first link and the second link; the first information is transmitted via an air interface; for an SCS of a subcarrier occupied by the second signal in frequency domain, and a time length of a slot of the second link is equal to a first length; the first information is used to indicate an integer ratio between the first timing offset and the first length.

In one embodiment, the first transmitter 1302 transmits third information; herein, the third information is used to indicate the reference delay, the reference delay is also related to an SCS of a subcarrier occupied by the second signaling in frequency domain, and the third information is transmitted via an air interface.

In one embodiment, the first signaling is used to determine a second delay, a first slot is an earliest slot comprising time-domain resources occupied by the first signal, and a start time of the first slot is not earlier than an end time for receiving the first signaling; for an SCS of a subcarrier occupied by the first signal in frequency domain, the first slot is an earliest slot satisfying that a length of a time interval between the start time of the first slot and the end time for receiving the first signaling is not less than the second delay.

In one embodiment, the first signaling is used to determine a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is one of an end time for receiving the first signaling, an end time for transmitting the first signal or an end time for receiving the second signaling.

Embodiment 14

Figure 14:
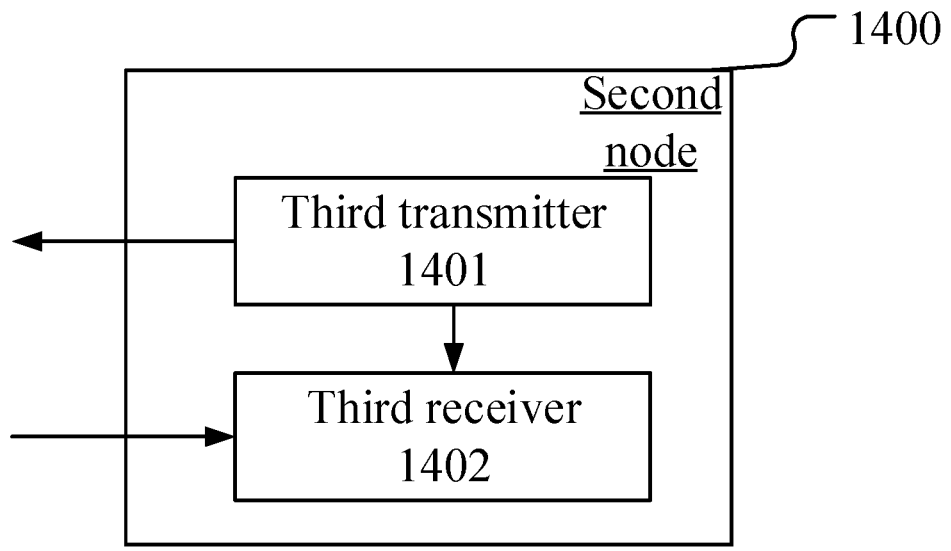
FIG. 14 illustrates a structure block diagram of a processing device in second node according to one embodiment of the present disclosure.

Embodiment 14 illustrates a structure block diagram of a processing device in a second node according to one embodiment of the present disclosure, as shown in FIG. 14. In FIG. 14, a processing device in a second node 1400 comprises a third transmitter 1401 and a third receiver 1402. The third transmitter 1401 comprises the transmitter/receiver 416 (including the antenna 460), the transmitting processor 415 and the controller/processor 440 in FIG. 4 of the present disclosure; and the third receiver 1402 comprises the transmitter/receiver 416 (including the antenna 420), the receiving processor 412 and the controller/processor 440 in FIG. 4 of the present disclosure.

In embodiment 14, the third transmitter 1401 transmits a first signaling; the third receiver 1402 receives a second signal; the first signaling is used to indicate time-frequency resources occupied by a first signal, the first signaling is used to indicate radio resources occupied by the second signal, and time-frequency resources occupied by the first signal are used to determine radio resources occupied by a second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, and a transmitter of the second signaling is a node other than the second node.

In one embodiment, the third receiver 1402 receives first information; herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first information is used to determine the first timing offset, and the reference link is one of the first link and the second link; the first information is transmitted via an air interface.

In one embodiment, the third receiver 1402 receives first information; the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first information is used to determine the first timing offset, and the reference link is one of the first link and the second link; the first information is transmitted via an air interface; the third transmitter 1401 transmits second information; the second information is used to indicate a second timing offset, the second timing offset is used to indicate a timing offset between a timing of the first link and a timing of the second link, and the first information is used to indicate a relation between the first timing offset and the second timing offset; the second information is transmitted via an air interface.

In one embodiment, the third receiver 1402 receives first information; herein, the first signaling is transmitted through a first link, the second signal is transmitted through a second link, the first signal is transmitted through a third link, and any two of the first link, the second link and the third link are different; a timing offset between a timing of the third link and a timing of a reference link is equal to a first timing offset, the first information is used to determine the first timing offset, and the reference link is one of the first link and the second link; the first information is transmitted via an air interface; for an SCS of a subcarrier occupied by the second signal in frequency domain, and a time length of a slot of the second link is equal to a first length; the first information is used to indicate an integer ratio between the first timing offset and the first length.

In one embodiment, the third receiver 1402 receives third information; herein, the third information is used to determine the reference delay, the reference delay is also related to an SCS of a subcarrier occupied by the second signaling in frequency domain, and the third information is transmitted via an air interface.

In one embodiment, the first signaling is used to indicate a second delay, a first slot is an earliest slot comprising time-domain resources occupied by the first signal, and a start time of the first slot is not earlier than an end time for receiving the first signaling; for an SCS of a subcarrier occupied by the first signal in frequency domain, the first slot is an earliest slot satisfying that a length of a time interval between the start time of the first slot and the end time for receiving the first signaling is not less than the second delay.

In one embodiment, the first signaling is used to indicate a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is one of an end time for receiving the first signaling, an end time for transmitting the first signal or an end time for receiving the second signaling.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling;
a first transmitter, transmitting a first signal;
a second receiver, receiving a second signaling; and
a second transmitter, transmitting a second signal;
wherein the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to a subcarrier spacing (SCS) of a subcarrier occupied by the second signal in frequency domain; the second signaling is used to determine information carried by the second signal, information carried by the second signal is the same as HARQ-ACK (Hybrid Automatic Repeat Request-Acknowledgement) information carried by the second signaling, and a transmitter of the first signaling is different from a transmitter of the second signaling; the first signaling carries DCI (Downlink Control Information), the first signal is transmitted through a PSSCH (Physical Sidelink Shared Channel), the second signaling is transmitted through a PSFCH (Physical Sidelink Feedback Channel), and the second signal is transmitted through a PUCCH (Physical Uplink Control Channel) or a PUSCH (Physical Uplink Shared Channel).

2. The first node according to claim 1, wherein the first transmitter transmits third information; wherein the third information is used to indicate the reference delay, the reference delay is also related to an SCS of a subcarrier occupied by the second signaling in frequency domain, and the third information is transmitted via an air interface.

3. The first node according to claim 1, wherein the first signaling is used to determine a second delay, a first slot is an earliest slot comprising time-domain resources occupied by the first signal, and a start time of the first slot is not earlier than an end time for receiving the first signaling; for an SCS of a subcarrier occupied by the first signal in frequency domain, the first slot is an earliest slot satisfying that a length of a time interval between the start time of the first slot and the end time for receiving the first signaling is not less than the second delay.

4. The first node according to claim 3, wherein the first signaling is used to indicate a target delay, a difference value of the target delay and half of a second timing offset is equal to the second delay, the second timing offset is equal to a Timing Advance (TA), and the first slot is a sidelink slot.

5. The first node according to claim 1, wherein the first signaling is used to determine a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is an end time for receiving the second signaling.

6. The first node according to claim 1, wherein the reference delay is equal to an integral number of Orthogonal Frequency Division Multiplexing (OFDM) symbol(s) other than an earliest OFDM symbol in a slot; an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a smaller one between the first index and the second index.

7. The first node according to claim 1, wherein the first delay is equal to a time length of at least one slot corresponding to an SCS of a subcarrier occupied by the second signal in frequency domain, and the first delay is represented by a number of slot(s).

8. A second node for wireless communications, comprising:
a third transmitter, transmitting a first signaling; and
a third receiver, receiving a second signal;
wherein the first signaling is used to indicate time-frequency resources occupied by a first signal, the first signaling is used to indicate radio resources occupied by the second signal, and time-frequency resources occupied by the first signal are used to determine radio resources occupied by a second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, information carried by the second signal is the same as HARQ-ACK (Hybrid Automatic Repeat Request-Acknowledgement) information carried by the second signaling, and a transmitter of the second signaling is a node other than the second node; the first signaling carries DCI (Downlink Control Information), the first signal is transmitted through a PSSCH (Physical Sidelink Shared Channel), the second signaling is transmitted through a PSFCH (Physical Sidelink Feedback Channel), and the second signal is transmitted through a PUCCH (Physical Uplink Control Channel) or a PUSCH (Physical Uplink Shared Channel).

9. The second node according to claim 8, wherein the third receiver receives third information; wherein the third information is used to indicate the reference delay, the reference delay is also related to an SCS of a subcarrier occupied by the second signaling in frequency domain, and the third information is transmitted via an air interface.

10. The second node according to claim 8, wherein the first signaling is used to indicate a target delay, a difference value of the target delay and half of a second timing offset is equal to a second delay, and the second timing offset is equal to a TA; a first slot is an earliest slot comprising time-domain resources occupied by the first signal, a start time of the first slot is not earlier than an end time for receiving the first signaling, and the first slot is a sidelink slot; for an SCS of a subcarrier occupied by the first signal in frequency domain, the first slot is an earliest slot satisfying that a length of a time interval between the start time of the first slot and the end time for receiving the first signaling is not less than the second delay.

11. The second node according to claim 8, wherein the first signaling is used to determine a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is an end time for receiving the second signaling.

12. The second node according to claim 8, wherein the reference delay is equal to an integral number of OFDM symbol(s) other than an earliest OFDM symbol in a slot; an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a smaller one between the first index and the second index.

13. The second node according to claim 8, wherein the first delay is equal to a time length of at least one slot corresponding to an SCS of a subcarrier occupied by the second signal in frequency domain, and the first delay is represented by a number of slot(s).

14. A method in a first node for wireless communications, comprising:
receiving a first signaling;
transmitting a first signal;
receiving a second signaling; and
transmitting a second signal;
wherein the first signaling is used to determine time-frequency resources occupied by the first signal, the first signaling is used to determine radio resources occupied by the second signal, and time-frequency resources occupied by the first signal are used to determine radio resources occupied by the second signaling; a length of a time interval between an end time for receiving the second signaling and a start time for transmitting the second signal is equal to a first delay, and the end time for receiving the second signaling is earlier than the start time for transmitting the second signal; the first delay is not less than a reference delay, and the reference delay is related to an SCS of a subcarrier occupied by the second signal in frequency domain; the second signaling is used to determine information carried by the second signal, information carried by the second signal is the same as HARQ-ACK (Hybrid Automatic Repeat Request-Acknowledgement) information carried by the second signaling, and a transmitter of the first signaling is different from a transmitter of the second signaling; the first signaling carries DCI (Downlink Control Information), the first signal is transmitted through a PSSCH (Physical Sidelink Shared Channel), the second signaling is transmitted through a PSFCH (Physical Sidelink Feedback Channel), and the second signal is transmitted through a PUCCH (Physical Uplink Control Channel) or a PUSCH (Physical Uplink Shared Channel).

15. The method in a first node according to claim 14, comprising:
transmitting third information;
wherein the third information is used to indicate the reference delay, the reference delay is also related to an SCS of a subcarrier occupied by the second signaling in frequency domain, and the third information is transmitted via an air interface.

16. The method in a first node according to claim 14, wherein the first signaling is used to determine a second delay, a first slot is an earliest slot comprising time-domain resources occupied by the first signal, and a start time of the first slot is not earlier than an end time for receiving the first signaling; for an SCS of a subcarrier occupied by the first signal in frequency domain, the first slot is an earliest slot satisfying that a length of a time interval between a start time of the first slot and an end time for receiving the first signaling is not less than the second delay.

17. The method in a first node according to claim 16, wherein the first signaling is used to indicate a target delay, a difference value of the target delay and half of a second timing offset is equal to the second delay, the second timing offset is equal to a TA, and the first slot is a sidelink slot.

18. The method in a first node according to claim 14, wherein the first signaling is used to determine a third delay, a second slot is an earliest slot comprising time-domain resources occupied by the second signal, for an SCS of a subcarrier occupied by the second signal in frequency domain, the second slot is an earliest slot satisfying that a length of a time interval between its start time and a reference time is not less than the third delay; the reference time is an end time for receiving the second signaling.

19. The method in a first node according to claim 14, wherein the reference delay is equal to an integral number of OFDM symbol(s) other than an earliest OFDM symbol in a slot; an index of an SCS of a subcarrier occupied by the second signal in frequency domain is a first index, an index of an SCS of a subcarrier occupied by the second signaling in frequency domain is a second index, the first index is a non-negative integer, the second index is a non-negative integer, and the reference delay is related to a smaller one between the first index and the second index.

20. The method in a first node according to claim 14, wherein the first delay is equal to a time length of at least one slot corresponding to an SCS of a subcarrier occupied by the second signal in frequency domain, and the first delay is represented by a number of slot(s).

* * * * *